United States Patent
Iwashita et al.

(10) Patent No.: US 7,183,739 B2
(45) Date of Patent: Feb. 27, 2007

(54) SYNCHRONOUS CONTROL DEVICE

(75) Inventors: Yasusuke Iwashita, Yamanashi (JP); Hiroyuki Kawamura, Yamanashi (JP); Zhiwei Tang, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/790,697

(22) Filed: Mar. 3, 2004

(65) Prior Publication Data
US 2004/0180606 A1 Sep. 16, 2004

(30) Foreign Application Priority Data
Mar. 4, 2003 (JP) ............................ 2003/056922
Jan. 13, 2004 (JP) ............................ 2004/005924

(51) Int. Cl.
*G05B 11/32* (2006.01)
(52) U.S. Cl. ...................... 318/625; 318/560; 318/569; 318/600; 318/628; 318/632
(58) Field of Classification Search ........ 318/560–632, 318/700, 66–69, 77–85, 98, 99, 52
See application file for complete search history.

(56) References Cited

U.S. PATENT DOCUMENTS

| | | | | |
|---|---|---|---|---|
| 5,025,200 A | * | 6/1991 | Kurakake et al. | 318/569 |
| 5,047,702 A | * | 9/1991 | Hanaki et al. | 318/625 |
| 5,086,263 A | * | 2/1992 | Kubota et al. | 318/568.11 |
| 5,134,354 A | * | 7/1992 | Yamamoto et al. | 318/609 |
| 5,181,441 A | * | 1/1993 | Okada | 82/1.11 |
| 5,204,602 A | * | 4/1993 | Iwashita | 318/630 |
| 5,252,902 A | * | 10/1993 | Uehara et al. | 318/599 |
| 5,600,221 A | * | 2/1997 | Tomatsuri et al. | 318/632 |
| 5,736,822 A | * | 4/1998 | Mitarai et al. | 318/116 |
| 5,864,216 A | * | 1/1999 | Shimizu et al. | 318/599 |
| 6,025,689 A | * | 2/2000 | Prentice et al. | 318/625 |
| 6,034,498 A | * | 3/2000 | Hamamura et al. | 318/632 |
| 6,046,566 A | * | 4/2000 | Sonoda et al. | 318/625 |
| 6,157,157 A | * | 12/2000 | Prentice et al. | 318/625 |
| 6,315,903 B1 | * | 11/2001 | Noyes | 210/601 |
| 6,333,615 B1 | * | 12/2001 | Maezawa et al. | 318/625 |
| 6,337,042 B1 | * | 1/2002 | Nakashima et al. | 264/40.5 |
| 6,384,561 B1 | * | 5/2002 | Niizuma et al. | 318/625 |
| 6,534,944 B2 | * | 3/2003 | Toyozawa et al. | 318/625 |

(Continued)

FOREIGN PATENT DOCUMENTS

EP 0 464 496 A2 1/1992

(Continued)

OTHER PUBLICATIONS

Notice of Reasons for Rejection (Office Action) and English translation, May 24, 2005.

(Continued)

*Primary Examiner*—Lincoln Donovan
*Assistant Examiner*—Tyrone Smith
(74) *Attorney, Agent, or Firm*—Staas & Halsey LLP

(57) ABSTRACT

There is provided a synchronous control device for driving the same control object with two servomotors. The synchronous control device detects the physical quantity that represents the difference between the forces on the two servomotors, and, on the basis of the detected value, reduces the force that acts between the two servomotors.

6 Claims, 19 Drawing Sheets

CALCULATION OF POSITION DEVIATION OFFSET FROM THE DIFFERENCE IN TORQUE COMMANDS

U.S. PATENT DOCUMENTS

| | | | |
|---|---|---|---|
| 6,566,837 B1 * | 5/2003 | Zhang et al. | 318/610 |
| 6,771,036 B2 * | 8/2004 | Fujita | 318/625 |
| 6,823,235 B2 * | 11/2004 | Toyozawa et al. | 700/193 |
| 2001/0008370 A1 | 7/2001 | Fujita | |

FOREIGN PATENT DOCUMENTS

| | | | |
|---|---|---|---|
| JP | 1-228752 | | 9/1989 |
| JP | 4-65701 | | 3/1992 |
| JP | 08-114172 | * | 5/1996 |
| JP | 8-328663 | | 12/1996 |
| JP | 09-042406 | * | 2/1997 |
| JP | 11-305839 | | 11/1999 |

OTHER PUBLICATIONS

European Search Report dated May 22, 2006, 3 pages.

Notice of Decision of Rejection with an English translation received in a foreign application, Jul. 4, 2006.

* cited by examiner

THE CASE OF APPLYING CORRECTIONS TO TWO MOTORS

FIG.12
CORRECTING THE POSITION OF ONE MOTOR FROM THE DIFFERENCE IN TORQUE COMMANDS
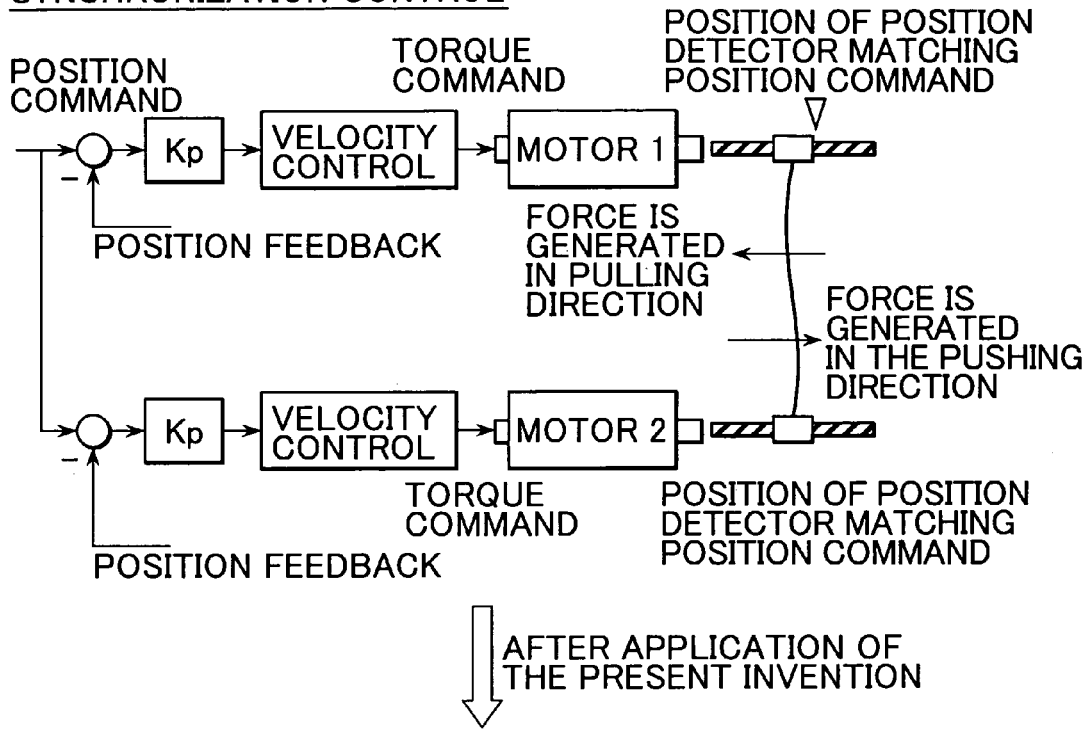
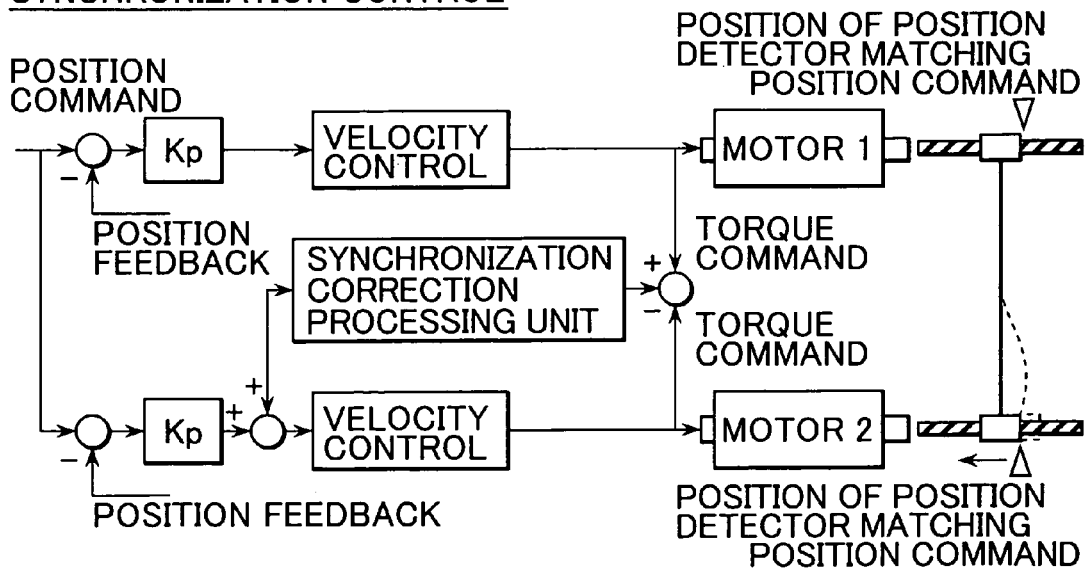

BEFORE APPLICATION

AFTER APPLICATION

BEFORE APPLICATION

AFTER APPLICATION

SYNCHRONOUS CONTROL DEVICE

BACKGROUND OF THE INVENTION

1. Field of the Invention

The present invention relates to a drive control device for a servomotor used as a drive source for machine tools, industrial machinery, robots, and other equipment controlled by a numerical control device (NC device).

2. Description of the Related Art

In machine tools, synchronous control is sometimes performed whereby an object is driven by a plurality of motors. Twisting may occur in a workpiece by disturbance that is external to the machining process when a large workpiece is driven by means of a single servomotor, as is the case with the C-axis of a crank grinder, for example. Such twisting of the workpiece affects machining accuracy. Workpiece twisting is reduced by providing two servomotors to the workpiece and synchronously controlling both servomotors so as to maintain synchronization in response to the twisting of the workpiece.

With this type of synchronization, a servomotor is provided to each of two shafts that are connected to the workpiece, and the servomotors are controlled with their respective servo circuit. Each servo circuit has a position control unit, velocity control unit, and electric current control unit, and receives the same position command from a numerical controller. The two servomotors, in order to correct synchronization misalignment, compute the correction amount with the aid of feedback values of the positions, and make corrections by which this correction amount is added to the position command from one of the servo circuits. An example of such prior art is disclosed in Japanese Patent Application Laid-open No. H11-305839, for example.

In synchronization control for driving one object with a plurality of motors, each motor operates by receiving the same position command from a host control device, and the position of each motor is controlled such that the position feedback values from the respective position detectors are in agreement with the position commands. In this type of synchronization control, the accuracy of the position detectors may be inadequate when the motors move in accordance with the position commands, or the actual end-point position may occasionally shift away from the instructed position when the machine is affected by thermal expansion. The reference position as such is also indeterminate because the scale itself, which is the positional reference, occasionally becomes displaced due to thermal expansion, for example.

When the rigidity between the motors is high in such a case, drawbacks arise in that a phenomenon occurs whereby the motors pull against each other so that stress is generated between the motors; the motors and amplifiers become heated; and machining accuracy decreases.

SUMMARY OF THE INVENTION

The synchronous control device according to the present invention, instead of controlling the position so that the position feedback values from the motors are in agreement with the position commands, computes the force that acts between the motors and reduces stress that is generated between the motors during synchronous control by performing control so that the force that acts between the motors is reduced.

The synchronous control device of the present invention comprises a position control unit for outputting velocity commands at each predetermined cycle on the basis of a predetermined position deviation between position feedback from a position detector and position commands transmitted at each predetermined cycle from a host control device or a host control unit, and a velocity control unit for outputting torque commands at each predetermined cycle on the basis of velocity feedback from velocity detectors and the velocity commands. The synchronous control device synchronously controls two servomotors for driving the same control object, and further comprises reducing means for the force that acts between the two servo motors on the basis of the force that acts between the two servomotors.

The means for reducing the force that acts between servomotors in the synchronous control device of the present invention can have an aspect in which the force that acts between servomotors is reduced by correcting position deviation, or an aspect in which the force that acts between servomotors is reduced by correcting position commands.

According to the aspect in which the position deviation is corrected, the position control unit comprises a position deviation offset calculation processor for calculating the offset amount of the position deviation on the basis of the force that acts between the two servomotors, and means for adding the position deviation offset amount calculated by the position deviation offset calculation processor to the position deviation.

The position deviation offset calculation processor may have a variety of aspects. According to the first aspect, the force that acts between servomotors is computed from the difference in the torque commands. The position deviation offset calculation processor computes the difference in the torque commands given to the two servomotors, and obtains the position deviation offset amount by multiplying the computed difference by a first conversion coefficient. The difference in torque commands corresponds to the force that acts between the two servomotors, and the first conversion coefficient is a coefficient for converting the deviation of the torque commands to the position deviation offset amount. Therefore, by multiplying the difference in torque commands by the first conversion coefficient, the position deviation offset amount can be obtained on the basis of the force that acts between the two servomotors. By adding this position deviation offset amount to the position deviation, position control can be carried out based on the force that acts between the servomotors.

According to the second aspect, the force that acts between the servomotors is computed from the difference in the actual electric currents that flow into the servomotors. The position deviation offset calculation processor computes the difference in the actual electric current that flows to the two servomotors, and the position deviation offset amount is obtained by multiplying the computed difference by a second conversion coefficient. The difference in the actual electric currents that flow into the servomotors corresponds to the force that acts between the servomotors, and the second conversion coefficient is a coefficient for converting the difference in the actual electric currents to the position deviation offset amount. Therefore, by multiplying the difference in the actual electric currents by the second conversion coefficient, the position deviation offset amount based on the force that acts between the two servomotors can be obtained. By adding this position deviation offset amount to the position deviation, position control based on the force that acts between the servomotors can be carried out.

According to yet another aspect, the position deviation offset amount with respect to the difference in torque commands, or the position deviation offset amount with respect to the difference in electric currents is computed in advance, the position deviation offset amount that corresponds to the difference in the torque commands or the difference in the actual electric currents is read, and this position deviation offset amount is added to the position deviation, whereby position control based on the force that acts between the servomotors is carried out. The position deviation offset amount with respect to the difference in the torque commands or the difference in the actual electric currents can be set in the form of a table, for example.

When the difference in force is small, heating and other drawbacks are minimal and the position deviation need not be corrected, and there also may be cases in which side effects occur in the sense that position deviations are generated in the slave by the deviation correction. In view of the above, a mode may be adopted whereby the position deviation is not corrected when the difference in force that acts between the motors is small, and the position deviation is corrected when the difference in force that acts between the motors exceeds a predetermined value.

According to this aspect, the position control unit comprises a position deviation offset calculation processor for calculating the offset amount of the position deviation in the case that the difference in force that acts between the two motors exceeds a fixed value, and means for adding the position deviation offset amount calculated by the position deviation offset calculation processor to the position deviation.

According to the first aspect of the position deviation offset calculation processor, the force that acts between the two servomotors is computed from the difference in torque commands given to the two servomotors, and the position deviation offset amount is calculated by multiplying the quantity by which the difference exceeds the fixed value, or the difference itself by the conversion coefficient.

According to the second aspect of the position deviation offset calculation processor, the force that acts between the two servomotors is computed from the difference between the actual electric currents that flow into the two servomotors, and the position deviation offset amount is calculated by multiplying the quantity by which the difference exceeds the fixed value, or the difference itself by the conversion coefficient.

The position deviation offset calculation processor has adjusting means for changing the position deviation offset at a frequency that is sufficiently lower than the frequency band of the position control unit. This adjusting means is capable of stabilizing position control.

Next, according to an aspect for correcting position commands, the position control unit comprises a position command offset calculation processor for calculating the offset amount of a position command on the basis of the force that acts on the two servomotors, and means for adding the position command offset amount calculated by the position command offset calculation processor to the position command.

The position command offset calculation processor may have a variety of aspects. According to the first aspect, the force that acts between the servomotors is computed from the difference in torque commands. The position command offset calculation processor computes the difference in torque commands given to the two servomotors, and obtains the position command offset amount by multiplying the computed difference by a third conversion coefficient. The difference in torque commands corresponds to the force that acts between the two servomotors, and the third conversion coefficient is a coefficient for converting the deviation of the torque commands to the position command offset amount. Therefore, by multiplying the difference in torque commands by the third conversion coefficient, the position command offset amount can be obtained based on the force that acts on the two servomotors. By adding this position command offset to the position command, position control can be carried out based on the force that acts between the servomotors.

According to the second aspect, the force that acts between the servomotors is computed from the difference in actual electric currents that flow into the servomotors. The position command offset calculation processor computes the difference in the actual electric currents that flow into the two servomotors, and obtains the position command offset by multiplying the computed difference by a fourth conversion coefficient. The difference in the actual electric current that flows to the servomotors corresponds to the force that acts between the two servomotors, and the fourth conversion coefficient is a coefficient for converting the deviation of the actual electric currents to the position command offset amount. Therefore, by multiplying the difference in actual electric currents by the fourth conversion coefficient, the position command offset value can be obtained based on the force that acts on the two servomotors. By adding this position command offset amount to the command position, position control based on the force that acts between the servomotors can be carried out.

According to an aspect for correcting position commands as well, the position command offset amount for the difference in torque commands, or the position command offset amount for the actual electric currents are computed in advance; the position command offset amount that corresponds to the difference in torque commands or the difference in actual electric currents is read; and this position command offset is added to the position commands, whereby position control is carried out based on the force that acts between the servomotors. The position command offset amount for the difference in torque commands and the difference in actual electric currents can be set in the form of a table, for example.

Correction of the position command may take a form in which the position command is not corrected when the difference in the forces between the motors is small, and the position command is corrected when the difference in the forces between the motors exceeds a predetermined value.

The position control unit comprises a position command offset calculation processor for calculating the offset amount of the position command when the difference between the forces on the two servomotors exceeds a set value, and means for adding the position command offset amount calculated by the position command offset calculation processor to the position command.

According to the first aspect of the position command offset calculation processor, the force that acts between the two servomotors is computed from the difference in torque commands given to the two servomotors, and the position command offset amount is calculated by multiplying the quantity by which the difference exceeds a fixed value, or the difference itself by the conversion coefficient.

According to the second embodiment of the position command offset calculation processor, the force that acts between the two servomotors is computed from the difference between the actual electric currents that flow into the two servomotors, and the position command offset amount is calculated by multiplying the quantity by which the difference exceeds the fixed value, or the difference itself by the conversion coefficient.

The position command offset calculation processor has adjusting means for changing the position command offset at a frequency that is sufficiently lower than the frequency band of the position control unit. This adjusting means is capable of stabilizing position control.

When this synchronous control device is applied to a feed shaft, the phenomenon whereby the two motors pull against each other is improved, the current commands for both motors are decreased, and the position deviation also becomes smaller. Furthermore, interference between motors is alleviated and interpolation accuracy improves during circular interpolation.

Side effects whereby position deviations are generated in the slave by the deviation correction can be prevented when correction is not carried out in the case that the force that acts between the motors is small, and when correction is carried out in the case that a predetermined value is exceeded.

With the synchronous control device of the present invention, stress that is generated between the motors can be decreased when one object is driven with a plurality of motors under synchronous control.

BRIEF DESCRIPTION OF THE DRAWINGS

These and other objects and characteristics of the present invention are described in detail by way of examples below with reference to the accompanying diagrams.

FIG. 12 is a diagram comparing conventional synchronous control and synchronous control according to the present invention.

DESCRIPTION OF THE PREFERRED EMBODIMENTS

A drive control system of a plurality of servomotors is composed of a host control device or a host control unit such as a numerical control device, shared RAM, a digital servo circuit, a power amplifier, and a plurality of servomotors; and these servomotors are connected to an object (workpiece) to constitute one drive system.

A processor for a digital servo circuit reads a position command given by a host control device or host control unit by way of shared RAM, and processes a position loop, velocity loop, and current loop. Position deviation is computed by subtracting the position feedback value from the position command, the position deviation is multiplied by the position gain to control the position loop and to compute the velocity command, the velocity feedback value is subtracted from the velocity command to compute the velocity deviation, and proportional and integral control and other types of velocity loop processing are performed to compute the torque command (electric current command). Electric current feedback is subtracted from the torque command, the voltage command for each phase is computed, and PWM (pulse width modulation) control and other control actions are carried out to controllably drive the servomotors.

Figure 1:
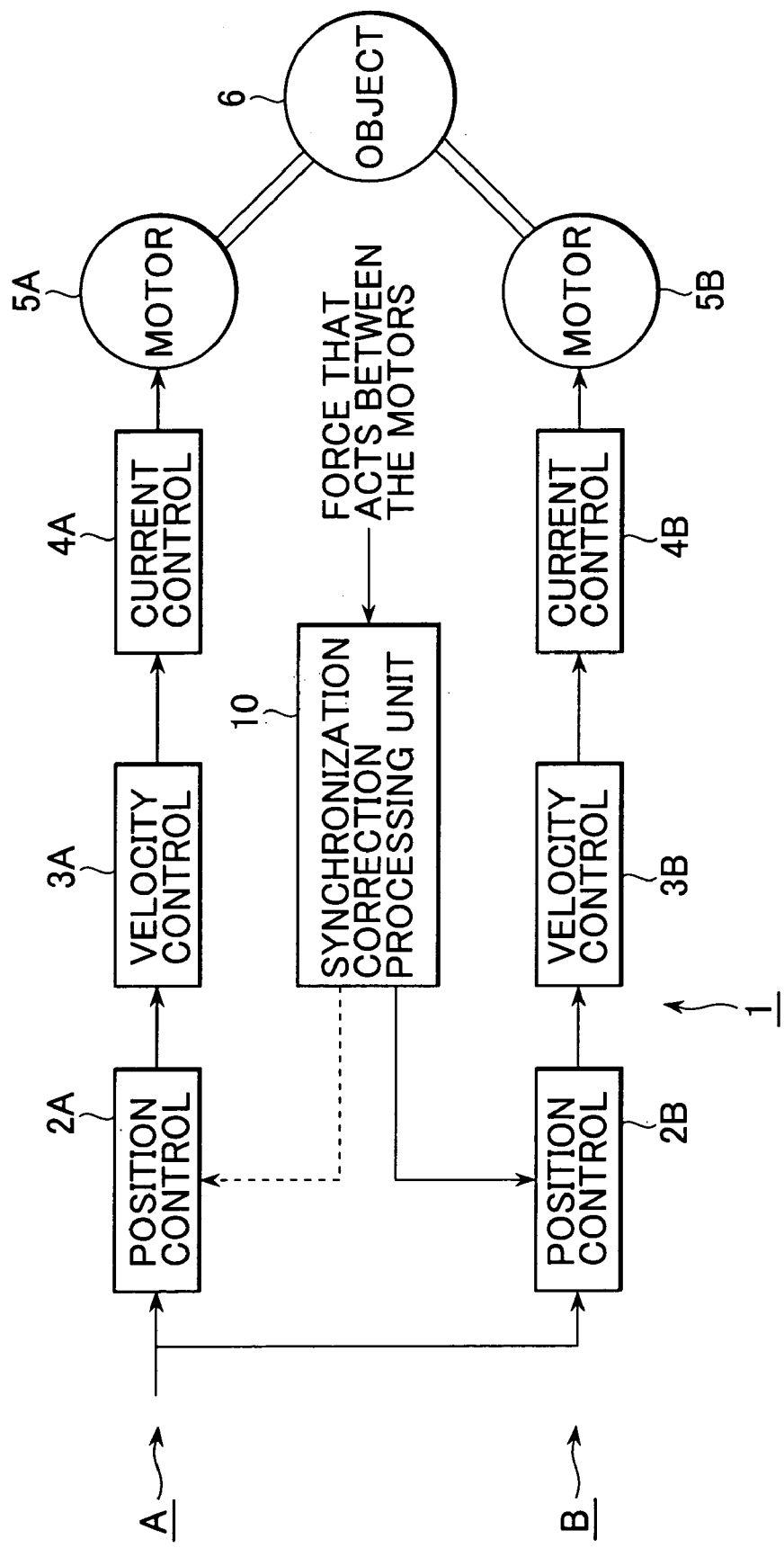
FIG. 1 is a schematic block diagram that provides an overview of the synchronous control device of the present invention.

FIG. 1 is a schematic block diagram that provides an overview of the synchronous control device of the present invention. In FIG. 1, servomotors 5A and 5B are connected in common to an object 6, and, together with a synchronous control device 1, constitute a drive system. The synchronous control device 1 has a servo circuit unit A (position control unit 2A, velocity control unit 3A, and electric current control unit 4A) for controlling the servomotor 5A, a servo circuit unit B (position control unit 2B, velocity control unit 3B, and electric current control unit 4B) for controlling the servomotor 5B, and a synchronization correction processing unit 10 for controlling synchronization on the basis of the force that acts between the servomotors 5A and 5B. The synchronization correction processing unit 10 corrects position deviations or position commands for the position control unit 2A and/or the position control unit 2B.

The servo circuit unit A has a position control unit 2A, a velocity control unit 3A, and an electric current control unit 4A in the same manner as a regular servo circuit; the position control unit 2A receives position commands from a host control device or a host control unit and transmits velocity commands to the velocity control unit 3A; the velocity control unit 3A receives velocity commands and transmits torque commands (electric current commands) to the electric current control unit 4A; and the electric current control unit 4A receives torque commands and transmits voltage commands to a power amplifier (not depicted). The power amplifier drives the servomotor 5A on the basis of the voltage commands.

The servo circuit unit B has a position control unit 2B, a velocity control unit 3B, and an electric current control unit 4B in the same manner as a regular servo circuit; the position control unit 2B receives position commands from a host control device or a host control unit and transmits velocity commands to the velocity control unit 3B; the velocity control unit 3B receives velocity commands and transmits torque commands (electric current commands) to the electric current control unit 4B; and the electric current control unit 4B receives torque commands and transmits voltage commands to a power amplifier (not depicted). The power amplifier drives the servomotor 5B on the basis of the voltage commands.

The synchronization correction processing unit 10 computes the force that acts between the servomotor 5A and servomotor 5B from the servo circuit unit A and the servo circuit unit B, and the value obtained by multiplying the force that acts between the motors by a conversion coefficient is input to the position control unit 2A and/or the position control unit 2B. The synchronization correction processing unit 10 moderates stress that acts between the servomotors 5A and 5B, and acts to synchronize the motors.

The synchronization correction processing unit 10 is capable of computing the force between the motors from the difference in torque commands given to the two servomotors, or from the difference in actual electric currents that flow into the two servomotors; and is also capable of correcting the position deviation with the position deviation offset computed from the force that acts between the motors, or correcting the position command with the position command offset computed from the force that acts between the motors.

An aspect for correcting the position deviation is described below with reference to FIGS. 2 to 6, and an aspect for correcting the position command is described below with reference to FIGS. 7 to 11.

Figure 2:
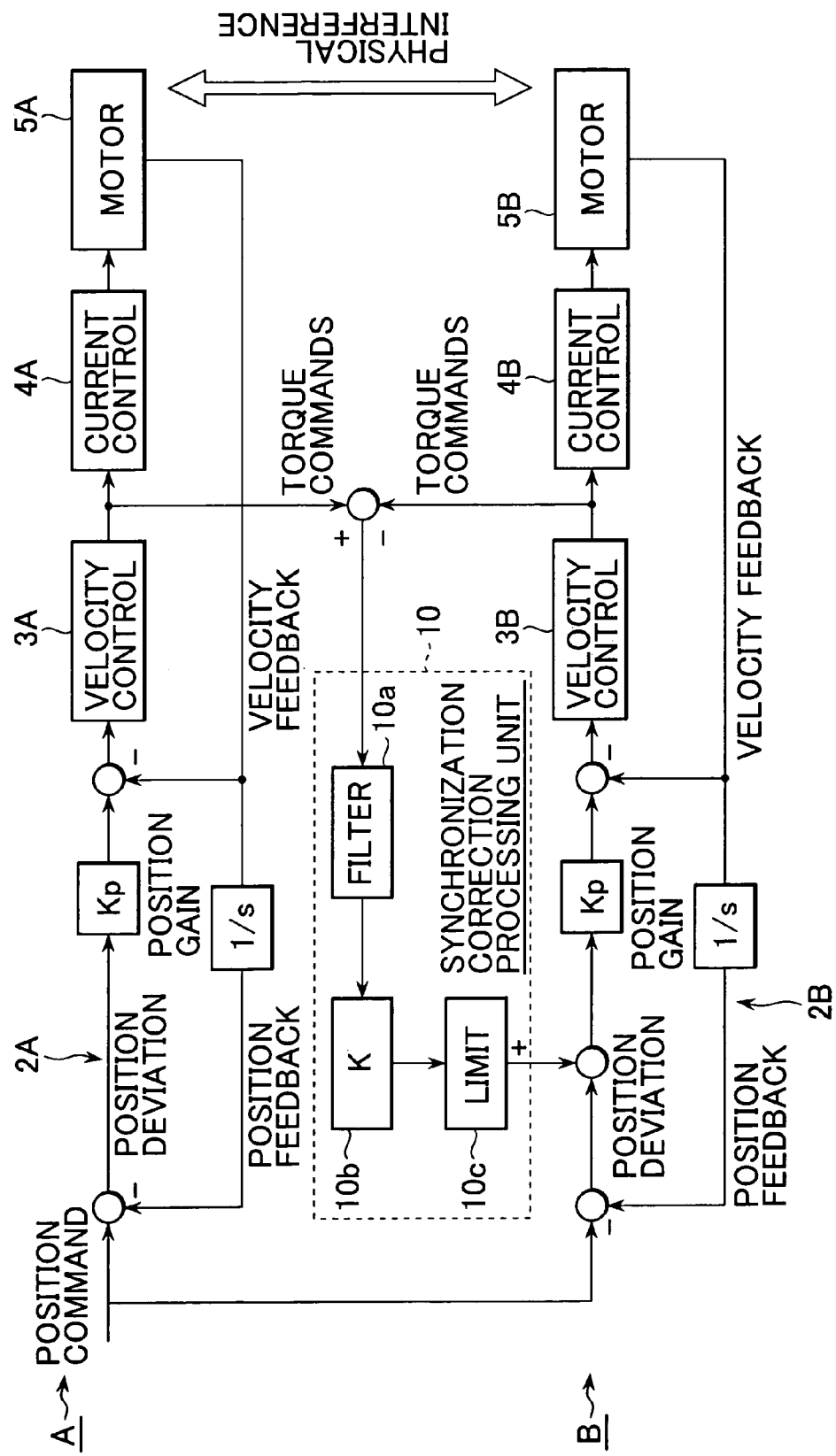
FIG. 2 is a diagram showing a structural example for correcting the position deviation with the position deviation offset obtained from the difference between the torque commands.
Figure 3:
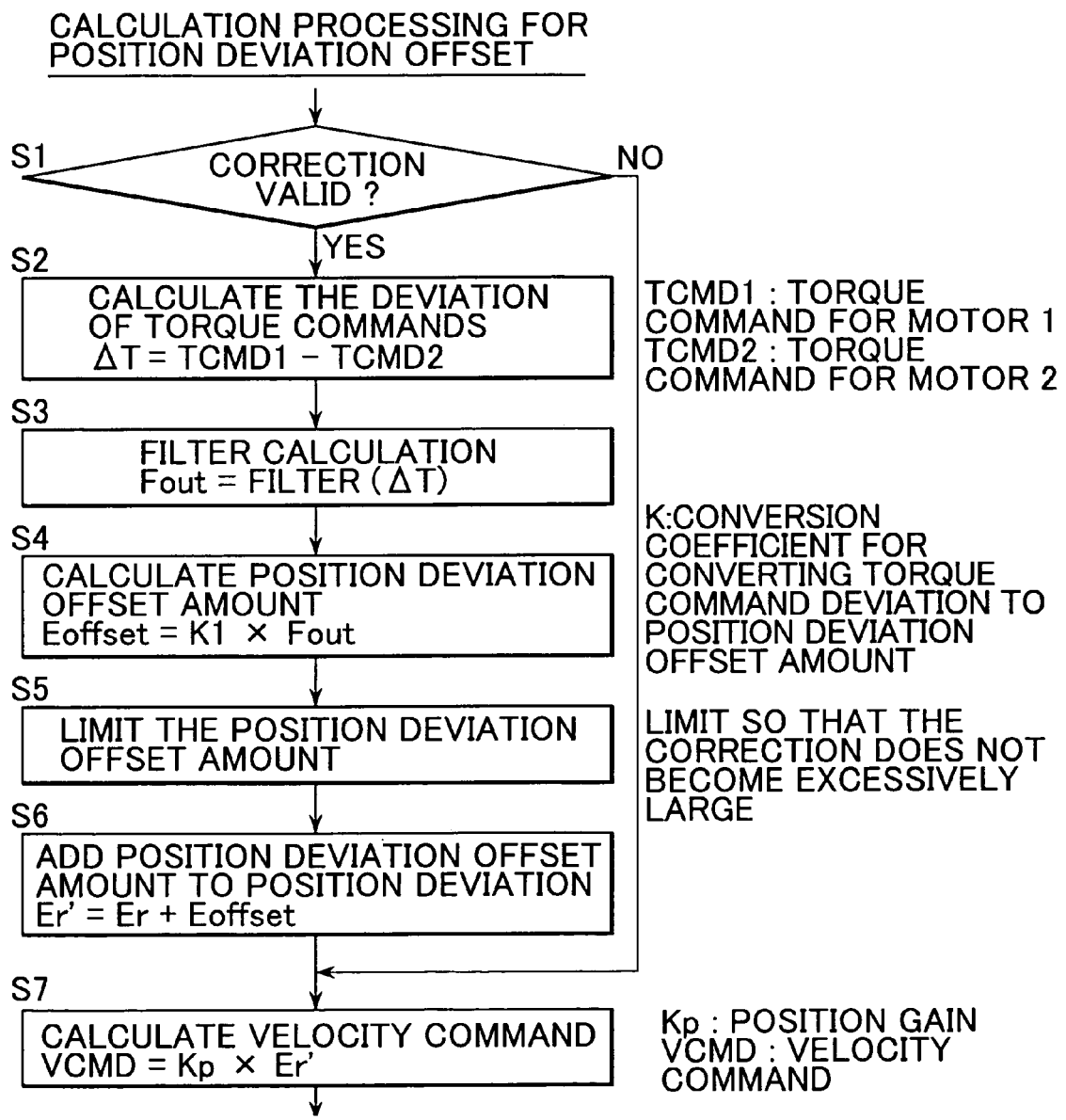
FIG. 3 is a flowchart of an aspect for correcting position deviations of the present invention.
Figure 4:
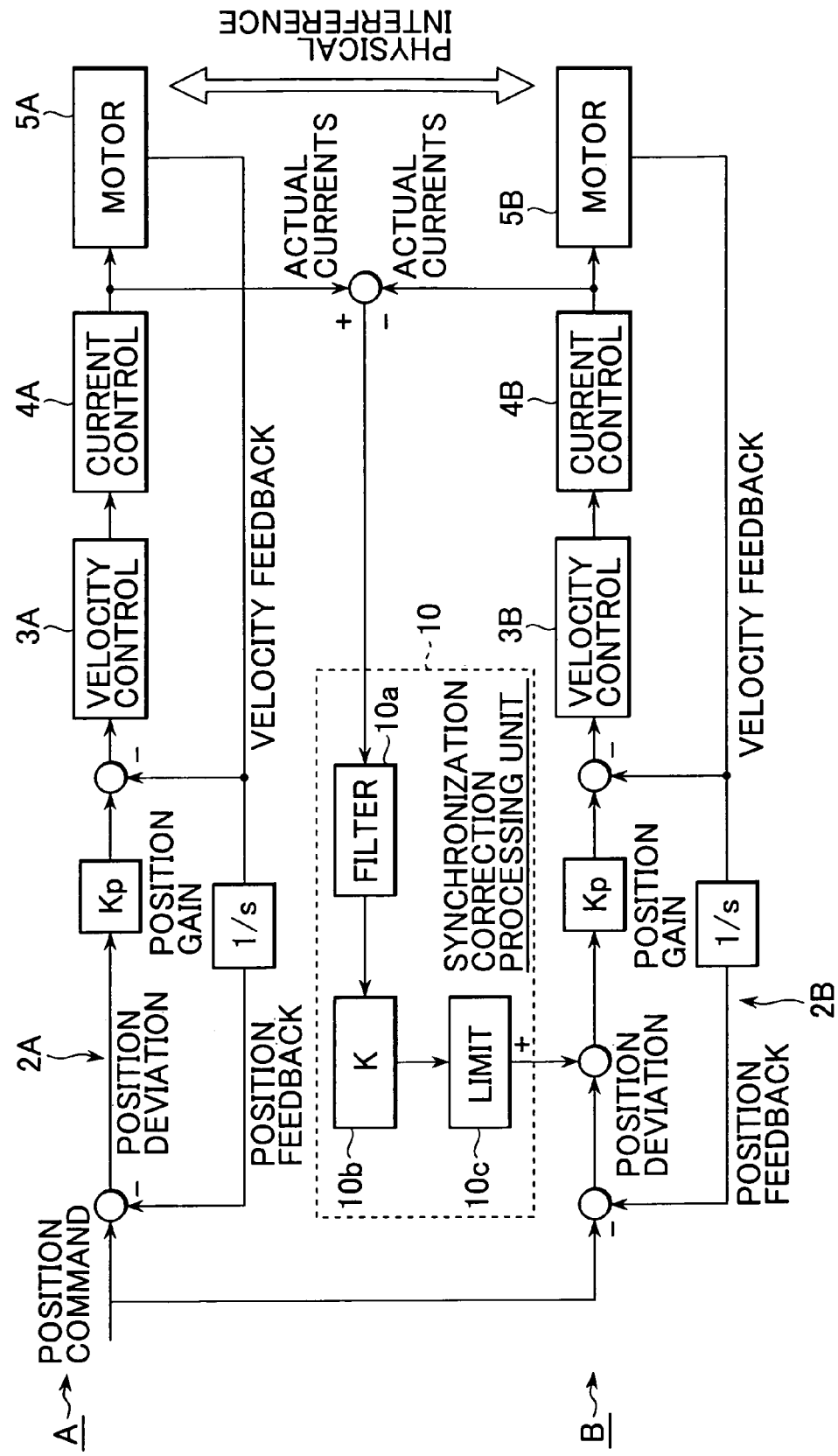
FIG. 4 is a diagram showing a structural example for correcting position deviations with position deviation offsets obtained from the difference between the actual electric currents.
Figure 5:
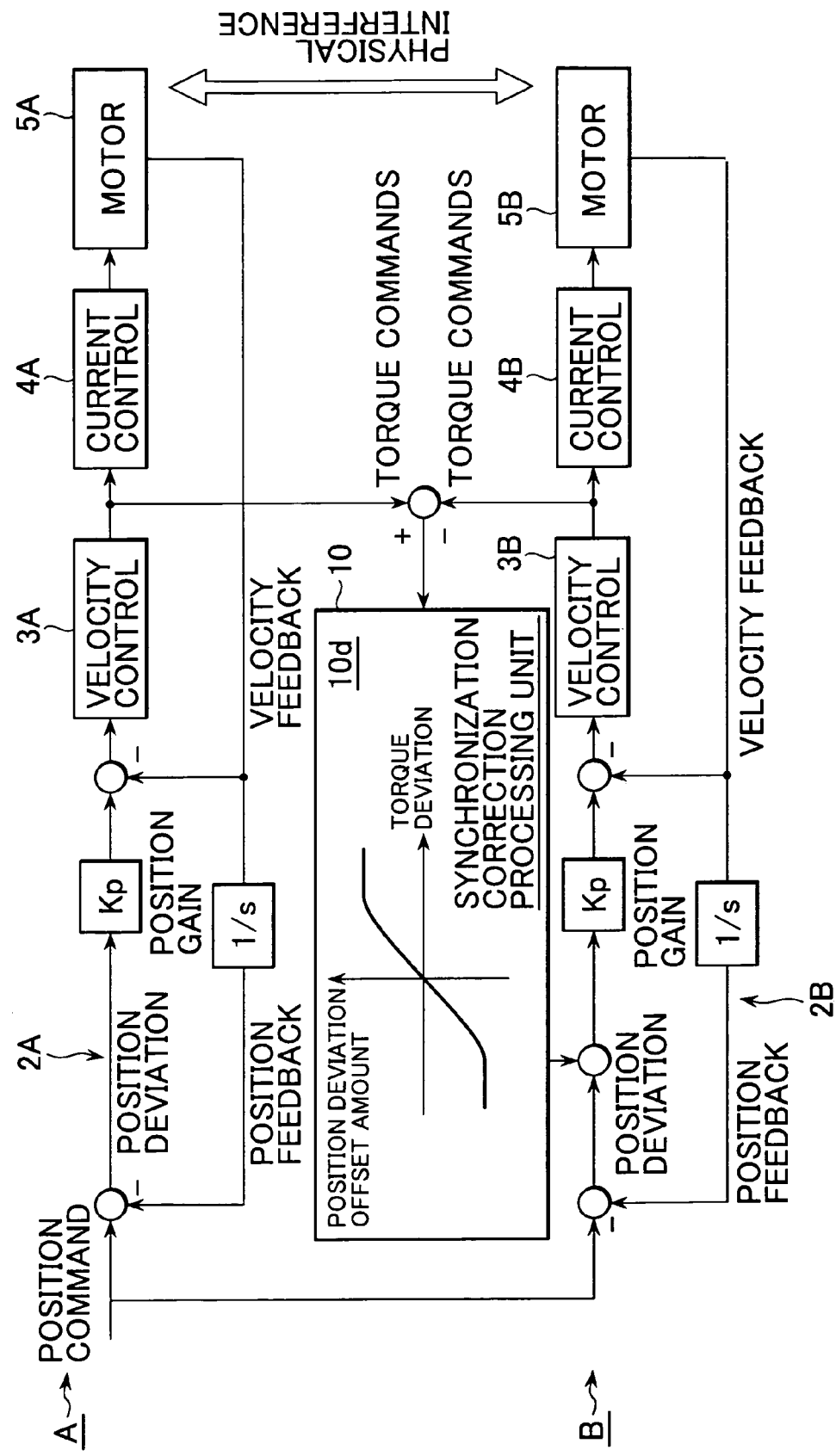
FIG. 5 is a diagram showing a structural example for correcting position deviations with a table of torque deviations and position deviation offsets.
Figure 6:
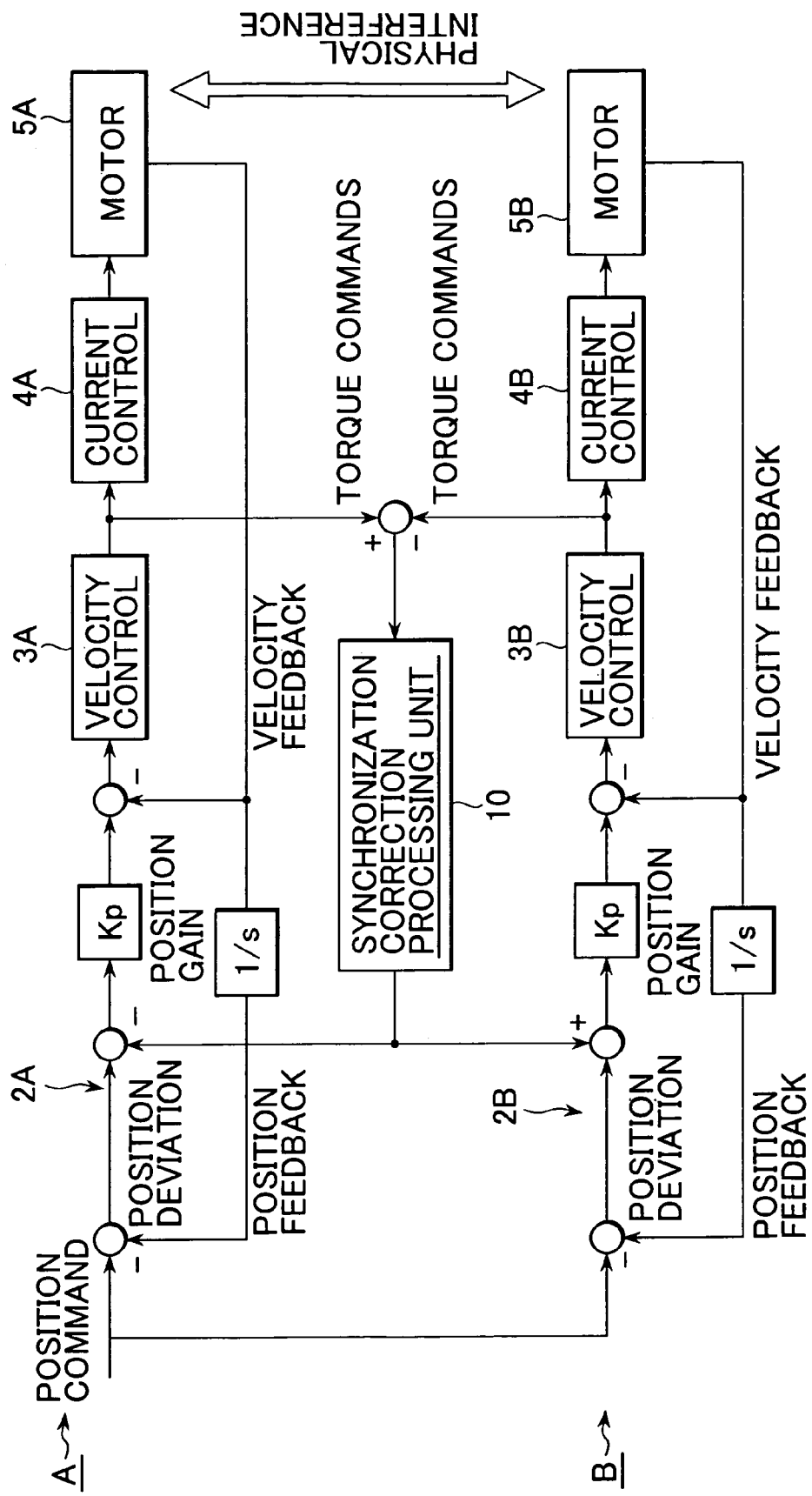
FIG. 6 is a diagram showing a structural example for carrying out position deviation corrections for two motors.
Figure 7:
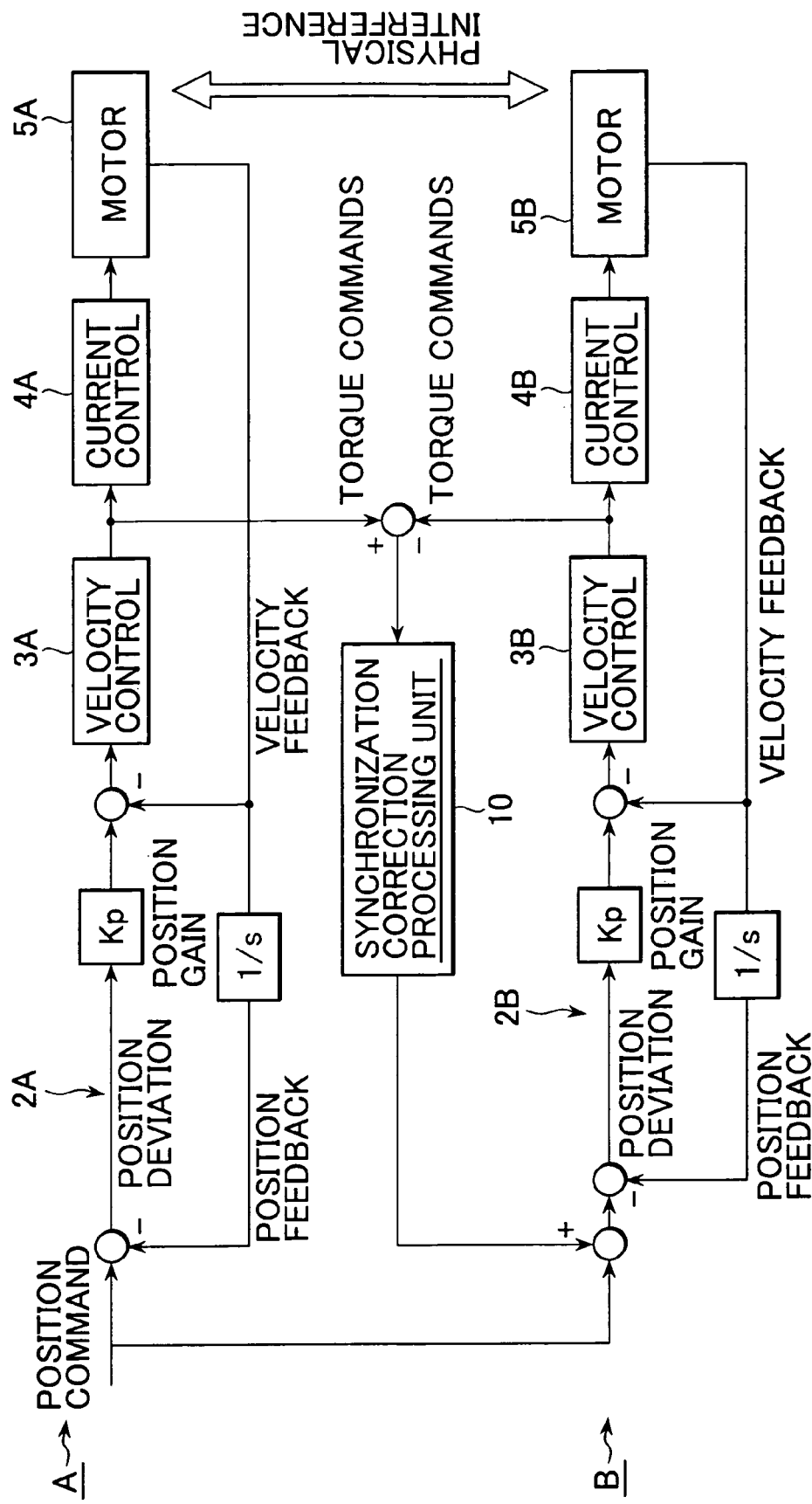
FIG. 7 is a diagram showing a structural example for correcting a position command with a position command offset obtained from the difference in torque commands.
Figure 8:
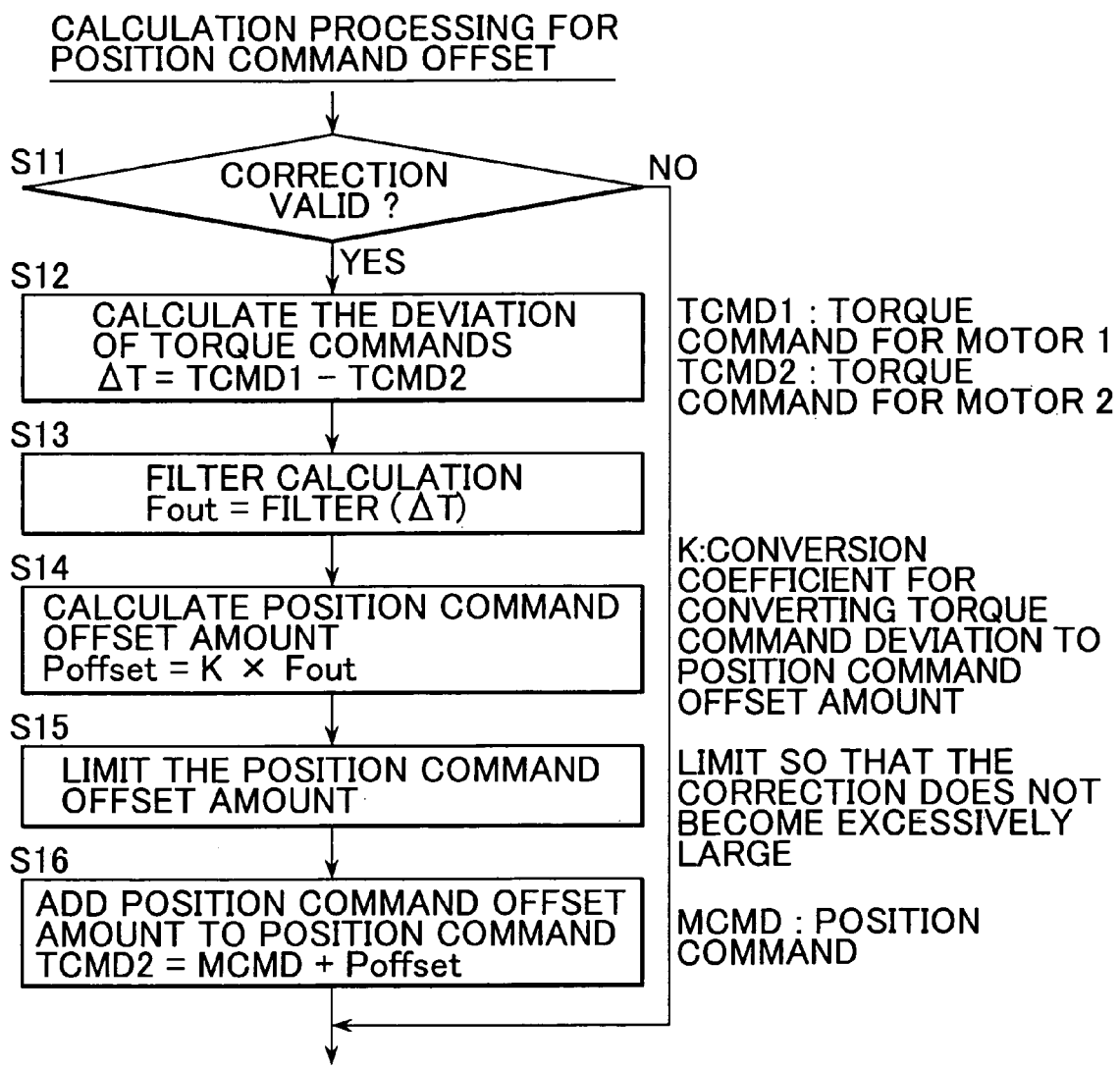
FIG. 8 is a flowchart of an embodiment for correcting position commands of the present invention.
Figure 9:
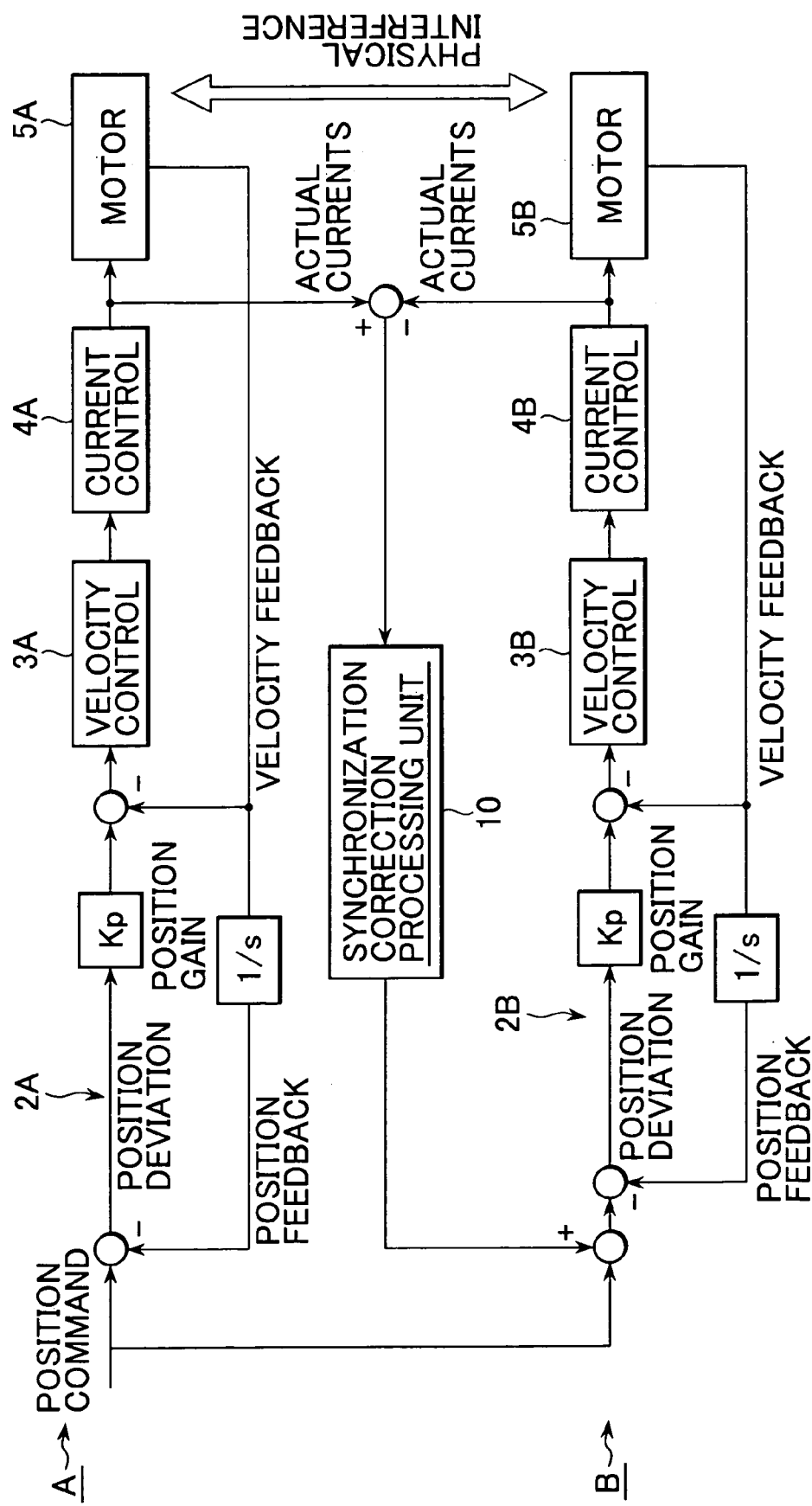
FIG. 9 is a diagram showing a structural example for correcting a position command with a position command offset obtained from the difference between the actual electric currents.
Figure 10:
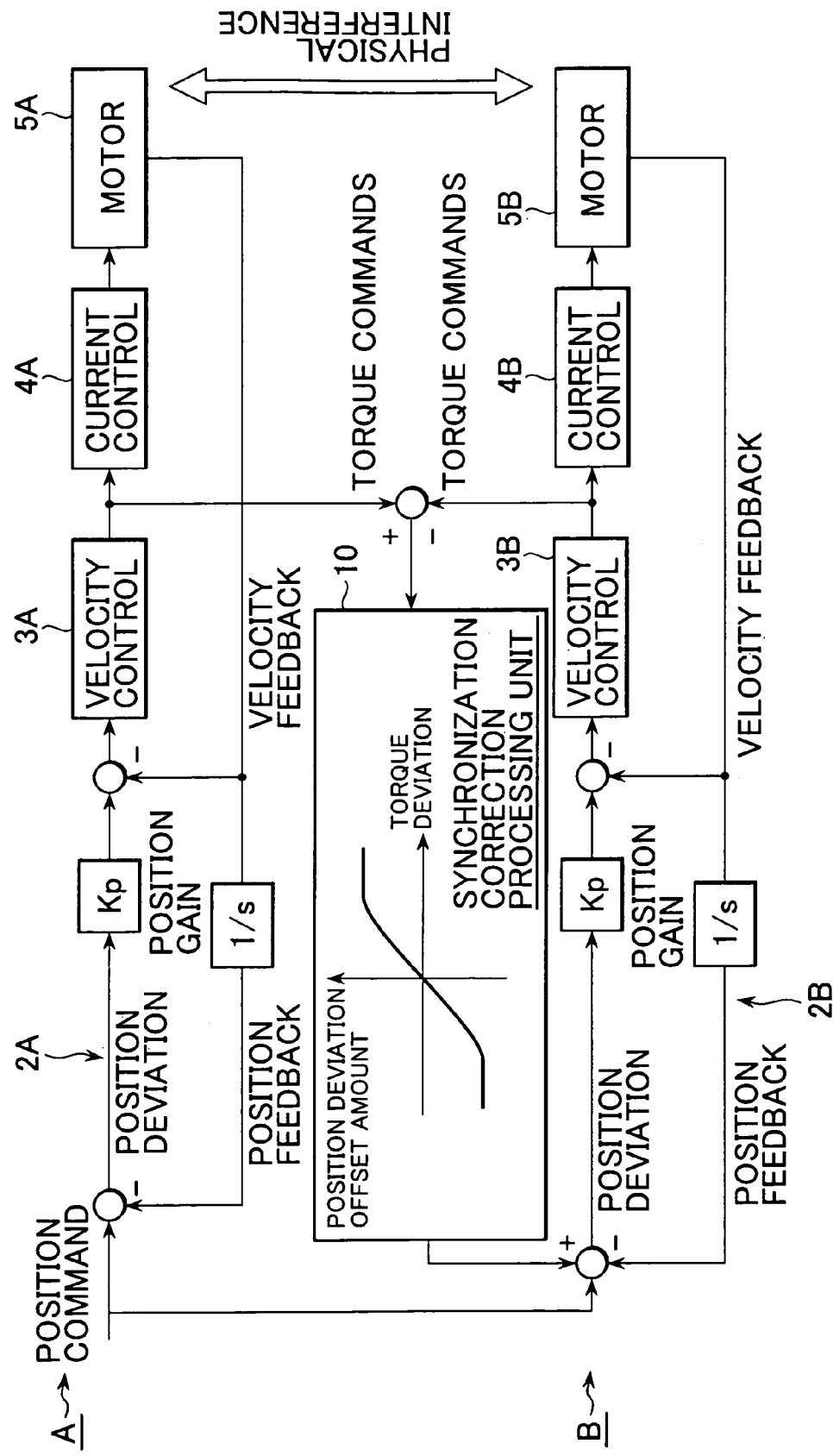
FIG. 10 is a diagram showing a structural example for correcting a position command with a table of torque deviations and position command offsets.
Figure 11:
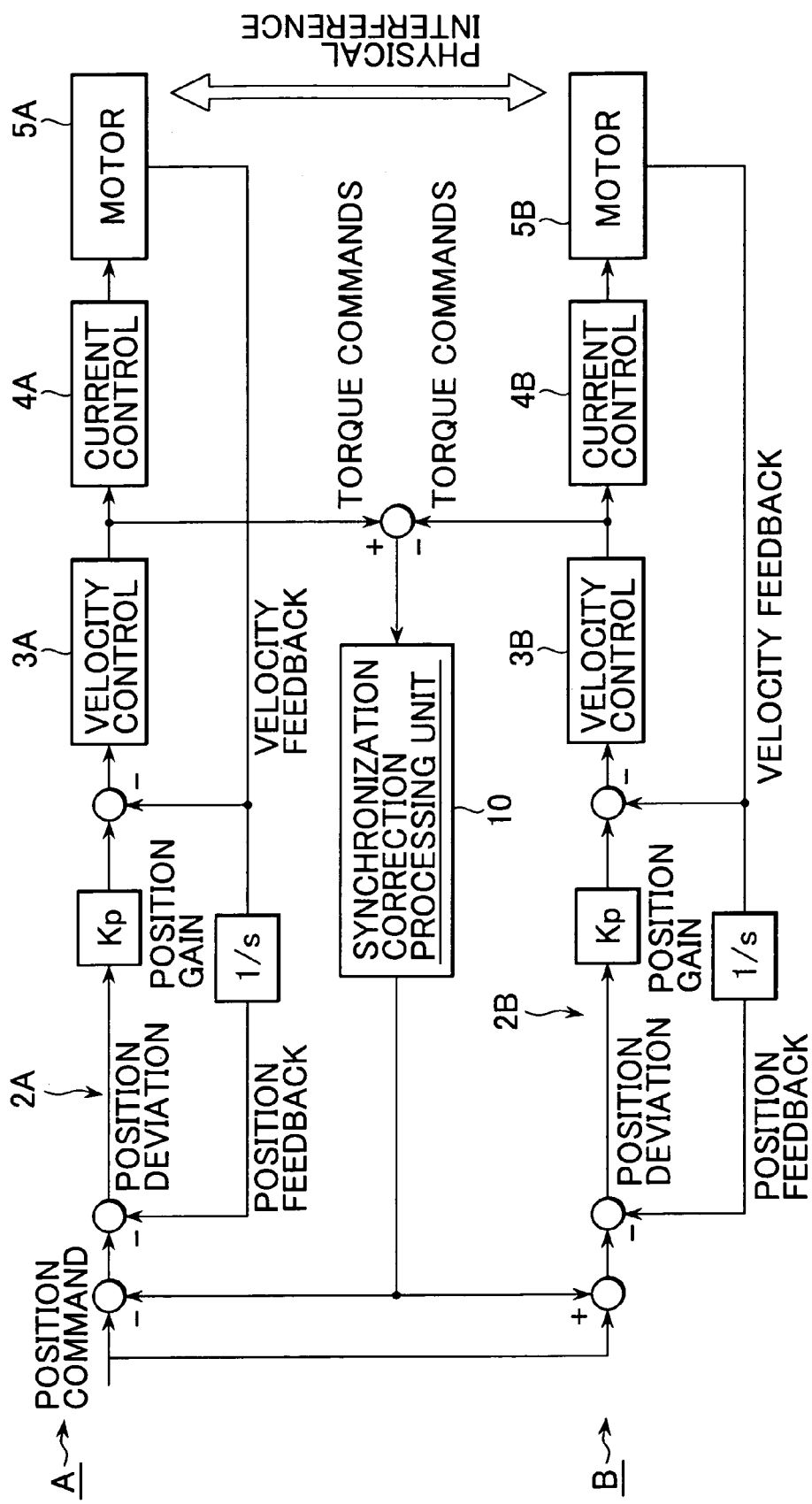
FIG. 11 is a diagram showing a structural example for carrying out position command corrections for two motors.

FIGS. 2 and 7 show an aspect in which the force that acts between the motors is computed from the difference in the torque commands given to the two servomotors; FIGS. 4 and 9 show an aspect in which the force that acts between the motors is computed from the difference in the actual electric currents that flow into the two servomotors; FIGS. 5 and 10 show an aspect that uses a table with a set relationship between the offset amount and the force that acts between the motors; and FIGS. 6 and 11 show an aspect in which corrections are applied to the two motors. FIG. 3 is a flowchart of an aspect for correcting position deviations, and FIG. 8 is a flowchart of an aspect for correcting position commands.

First, the aspect for correcting position deviations is described.

In the first example, the position deviation is corrected by the position deviation offset amount obtained from the difference in torque commands. FIG. 2 is a diagram showing an example for computing the force between the motors from the difference between the torque commands given to the two servomotors, and correcting the position deviation.

The servo circuit unit A has a position control unit 2A, a velocity control unit 3A, and an electric current control unit 4A in the same manner as a regular servo circuit. The position control unit 2A receives position commands from a host control device or a host control unit, subtracts position feedback from the position command to compute the position deviation, and transmits velocity commands obtained by multiplication with the position gain to the velocity control unit 3A.

The velocity control unit 3A receives velocity commands and transmits torque commands (electric current commands) obtained by subtracting velocity feedback from the velocity commands to the electric current control unit 4A. The electric current control unit 4A receives torque commands and transmits voltage commands to a power amplifier (not depicted), and the power amplifier drives the servomotor 5A on the basis of the voltage commands.

The servomotor 5A detects velocity via an encoder (not depicted) or other means. The detected velocity is fed back to the velocity control unit 3A. The position feedback can be computed by integrating the velocity feedback, or obtained by detecting the position by means of an encoder disposed in the servomotor 5A.

The servo circuit unit B has a position control unit 2B, a velocity control unit 3B, and an electric current control unit 4B in the same manner as a regular servo circuit. The position control unit 2B receives position commands from a host control device or a host control unit, subtracts position feedback from the position command to compute the position deviation, and transmits velocity commands obtained by multiplying the position deviation by the position gain to the velocity control unit 3B.

The velocity control unit 3B receives velocity commands and transmits torque commands (electric current commands) obtained by subtracting velocity feedback from the velocity commands to the electric current control unit 4B. The electric current control unit 4B receives torque commands and transmits voltage commands to a power amplifier (not depicted), and the power amplifier drives the servomotor 5B on the basis of the voltage commands.

The servomotor 5B detects velocity via an encoder (not depicted) or other means. The detected velocity is fed back to the velocity control unit 3B. The position feedback can be computed by integrating the velocity feedback, or obtained by detecting the position by means of an encoder disposed in the servomotor 5B.

The synchronization correction processing unit 10 has a filter 10a, means 10b for calculating the position deviation offset amount, and limiting means 10c for limiting the position deviation offset amount. The difference between the torque command from the velocity control unit 3A and the torque command from the velocity control unit 3B is input to the synchronization correction processing unit 10. The synchronization correction processing unit 10 computes the force between the motors from the difference in the torque commands given to the two servomotors, and computes the position deviation offset amount from the computed force. The computed position deviation offset amount is added to the position deviation of the servo circuit B to correct the position deviation.

The filter 10a extracts the low-frequency component of the difference in inputted torque commands in order to make corrections at a frequency that is lower than the frequency band of the position control unit 2A. The filter 10a may be composed of a low-pass filter, for example.

The means 10b for calculating the position deviation offset amount computes the position deviation offset amount by multiplying the deviation (difference) in the torque commands by a first conversion coefficient K1. The first conversion coefficient K1 is a coefficient for converting the deviation (difference) in torque commands to position deviation offset amount.

The limiting means 10c for limiting the position deviation offset amount applies a limitation so that the position deviation offset amount computed by the means 10b for calculating the position deviation offset amount does not become excessively large. The limiting value is set in advance.

The position deviation offset amount obtained by way of the synchronization correction processing unit 10 is added to the position deviation of the position control unit 2B of the servo circuit unit B. The position deviation offset amount is not limited to being added solely to the position deviation of the position control unit 2B of the servo circuit unit B, and may be added to the position deviation of the position control unit 2A of the servo circuit unit A.

Correcting the position deviation by way of the synchronization correction processing unit 10 reduces the physical interference between the servomotors 5A and 5B.

The flowchart shown in FIG. 3 depicts calculation processing for the position deviation offset performed by the synchronization correction processing unit, and FIG. 2 shows an example of computing the position deviation offset from the difference in torque commands.

In the synchronization correction processing unit, the torque command (TCMD1) of the motor circuit A and the torque command (TCMD2) of the motor circuit B are taken in if the correction function is valid (Step 1), and the deviation ΔT (=TCMD1−TCMD2) thereof is calculated (step S2).

The filter 10a extracts the low-frequency component Fout (=FILTER (ΔT)) from the deviation ΔT computed by the filter processing. FILTER (ΔT) represents filter processing and allows the desired filter characteristics to be set (step S3).

The means 10b for calculating the position deviation offset amount multiplies the deviation output Fout of the filter-processed torque commands by the first conversion coefficient K1, and calculates the position deviation offset amount Eoffset.

The position deviation offset based on the force that acts on the two servomotors is obtained by multiplying the difference between the torque commands by the first conversion coefficient K1 (step S4). A limit is applied so that the computed position deviation offset amount Eoffset does not exceed a limiting value. The limiting value can be set in accordance with the drive system of the motor (step S5).

The corrected position deviation Er (=Er+Eoffset) is computed by adding the computed position deviation offset amount to the position deviation of the position control unit. Position control is carried out based on the force that acts between the servomotors by adding the position deviation offset amount to the position deviation in this manner (step S6).

The position control unit 2B multiplies the corrected position deviation Er by the position gain Kp to calculate the velocity command VCMD (=Kp×Er), and the velocity command VCMD is transmitted to the velocity control unit 3B (step S7).

In the second example, the position deviation is corrected by the position deviation offset amount obtained from the difference in the actual electric currents. FIG. 4 shows an example of computing the force between the motors from the difference in the actual electric currents that flow into the two servomotors, and correcting the position deviation.

The structures of the servo circuit unit A and servo circuit unit B are the same as in FIG. 2, so a description is omitted here.

The synchronization correction processing unit 10 has a filter 10a, means 10b for calculating the position deviation offset amount, and limiting means 10c for limiting the position deviation offset amount. The difference between the actual electric current from the velocity control unit 4A and the actual electric current from the velocity control unit 4B is input to the synchronization correction processing unit 10. The synchronization correction processing unit 10 computes the force between the motors from the difference in the actual electric currents that flow into the two servomotors, and computes the position deviation offset amount from the computed force. The computed position deviation offset amount is added to the position deviation of the servo circuit B to correct the position deviation.

The filter 10a extracts the low-frequency component of the difference in inputted torque commands in order to make corrections at a frequency that is lower than the frequency band of the position control unit 2A. The filter 10a may be composed of a low-pass filter, for example.

The means 10b for calculating the position deviation offset amount computes the position deviation offset amount by multiplying the deviation (difference) in the actual electric currents by a second conversion coefficient K2. The second conversion coefficient K2 is a coefficient for converting the deviation (difference) in actual electric currents to the position deviation offset amount.

The limiting means 10c for limiting the position deviation offset amount applies a limitation so that the position deviation offset amount computed by the means 10b for calculating the position deviation offset amount does not become excessively large. The limiting value is set in advance.

The position deviation offset amount obtained by way of the synchronization correction processing unit 10 is added to the position deviation of the position control unit 2B of the servo circuit unit B. The position deviation offset amount is not limited to being added solely to the position deviation of the position control unit 2B of the servo circuit unit B, and may be added to the position deviation of the position control unit 2A of the servo circuit unit A.

Correcting the position deviation by way of the synchronization correction processing unit 10 reduces the physical interference between the servomotors 5A and 5B.

The calculation processing for the position deviation offset performed by the synchronization correction processing unit having the structure shown in FIG. 4 may be performed in the same manner as in the flowchart in FIG. 3 by replacing the torque command with the actual electric current and replacing the conversion coefficient K with the second conversion coefficient K2.

In the third example, the position deviation is corrected using a table of torque deviations and position deviation offsets. FIG. 5 is a diagram showing an example for correcting position deviations by using a table 10d with a set relationship between the force that acts between the motors and the offset amount. The structures of the servo circuit unit A and servo circuit unit B are the same as the examples shown in FIGS. 2 and 4, so a description is omitted here.

The synchronization correction processing unit 10 has recording means for computing the relationship between the torque deviation and the position deviation offset amount in advance by way of the structure in FIG. 2 or other means, and recording the relationship to the recording means. The relationship between the torque deviation and the position deviation offset amount is stored by means of a table or the like. When the difference (deviation) in torque commands is input, the corresponding position deviation offset amount is computed and output.

The position deviation offset amount obtained by way of the synchronization correction processing unit 10 is added to the position deviation of the position control unit 2B of the servo circuit unit B. The position deviation offset amount is not limited to being added solely to the position deviation of the position control unit 2B of the servo circuit unit B, and may be added to the position deviation of the position control unit 2A of the servo circuit unit A.

In the example shown in FIG. 5, the relationship between the torque deviations and the position deviation offset amounts is stored, but a structure may be adopted whereby the relationship between the actual electric currents and the position deviation amounts is stored, the difference in actual electric currents is input, and the position deviation offset amount is output.

In the structural examples shown in FIGS. 2 to 5, the position deviation offset amount that is output from the synchronization processing unit 10 is added to the position deviation of the position control unit of one of the servo circuits, but this amount may also be added to the position deviation of the position control units of both servo circuits. FIG. 6 is a fourth example, and it shows a structural example for adding the position deviation offset amount to the position deviation of the position control unit of both servo circuits.

Other than having a structure for adding the position deviation offset amount to the position deviation of the position control units 2A and 2B of the servo circuit units A and B, the structure is the same as that shown in FIG. 2, so a description is omitted here.

Next, an aspect for correcting position commands is described.

The fifth example is an example for correcting the position command with the position processing offset amount obtained from the difference in torque commands. FIG. 7 is a diagram showing an example for computing the force between motors from the difference in torque commands given to the two servomotors, and correcting the position command. The structure of the servo circuit unit A, servo circuit unit B, and synchronization correction processing unit 10 is the same as the example shown in FIG. 2, so a description is omitted here.

The synchronization correction processing unit 10 has a filter, means for calculating the position command offset amount, and limiting means for limiting the instruction command offset amount. The difference between the torque command from the velocity control unit 3A and the torque command from the velocity control unit 3B is input to the synchronization correction processing unit 10. The synchronization correction processing unit 10 computes the force between the motors from the difference in the torque commands given to the two servomotors, and computes the position deviation offset amount from the computed force. The computed position deviation offset amount is added to the position deviation of the servo circuit B to correct the position deviation.

The filter extracts the low-frequency component of the difference in inputted torque commands in order to make corrections at a frequency that is lower than the frequency band of the position control unit 2A. The filter may be composed of a low-pass filter, for example.

The means for calculating the position command offset amount computes the position command offset amount by multiplying the deviation (difference) in the torque commands by a third conversion coefficient K3. The third conversion coefficient K3 is a coefficient for converting the deviation (difference) in torque commands to the position command offset amount.

The limiting means for limiting the position command offset amount applies a limitation so that the position command offset amount computed by the means for calculating the position command offset amount does not become excessively large. The limiting value is set in advance.

The position command offset amount obtained by way of the synchronization correction processing unit 10 is added to the position command of the position control unit 2B of the servo circuit unit B. The position command offset amount is not limited to being added solely to the position command of the position control unit 2B of the servo circuit unit B, and may be added to the position command of the position control unit 2A of the servo circuit unit A.

Correcting the position command by way of the synchronization correction processing unit 10 reduces the physical interference between the servomotors 5A and 5B.

The flowchart shown in FIG. 8 shows calculation processing for the position command offset performed by the synchronization correction processing unit, and FIG. 7 shows an example of computing the position command offset from the difference in torque commands.

In the synchronization correction processing unit, the torque command (TCMD1) of the motor circuit A and the torque command (TCMD2) of the motor circuit B are taken in if the correction function is valid (step S11), and the deviation ΔT (=TCMD1−TCMD2) thereof is calculated (step S12).

The filter extracts the low-frequency component Fout (=FILTER (ΔT)) from the deviation ΔT computed by the filter processing. FILTER (ΔT) represents filter processing and allows the desired filter characteristics to be set (step S13).

The means for calculating the position command offset amount multiplies the deviation output Fout of the filter-processed torque commands by the third conversion coefficient K3, and calculates the position command offset amount Poffset.

The position command offset based on the force that acts on the two servomotors is obtained by multiplying the difference between the torque commands by the third conversion coefficient K3 (step S14). A limit is applied so that the computed position command offset amount Poffset does not exceed a limiting value. The limiting value can be set in accordance with the drive system of the motor (step S15).

The corrected position command MCMD (=MCMD+ Poffset) is computed by adding the computed position command offset amount to the position command of the position control unit. Position control is carried out based on the force that acts between the servomotors by adding the position command offset amount Poffset to the position command MCMD in this manner (step S16).

The position control unit 2B multiplies the position deviation Er obtained by subtracting the position feedback from the corrected position command MCMD by the position gain Kp to calculate the velocity command VCMD (=Kp× Er), and the calculated velocity command VCMD is transmitted to the velocity control unit 3B.

In the sixth example, a position command is corrected based on a position command offset amount obtained from the difference in the actual electric currents. FIG. 9 shows a structural example of an aspect in which a position command is corrected and in which the force that acts between the servomotors is computed from the difference in the actual electric currents that flow into the motors.

The structures of the servo circuit unit A, servo circuit unit B, and the synchronization correction processing unit 10 are the same as in FIGS. 2 and 4, so a description is omitted here.

The synchronization correction processing unit 10 has a filter, means for calculating position command offset amount, and limiting means for limiting the position command offset amount. The difference between the actual electric current from the velocity control unit 4A and the actual electric current from the velocity control unit 4B is input to the synchronization correction processing unit 10. The synchronization correction processing unit 10 computes the force between the motors from the difference in the actual electric currents that flow into the two servomotors, and computes the position command offset amount from the computed force. The computed position command offset amount is added to the position command of the servo circuit B to correct the position deviation.

The filter extracts the low-frequency component from the difference in the actual inputted electric currents in order to make corrections at a frequency that is lower than the frequency band of the position control unit 2A. The filter may be composed of a low-pass filter, for example.

The means for calculating the position command offset amount computes the position command offset amount by multiplying the deviation (difference) in the actual electric currents by a fourth conversion coefficient K4. The fourth conversion coefficient K4 is a coefficient for converting the deviation (difference) in actual electric currents to the position command offset amount.

The limiting means for limiting the position command offset amount applies a limitation so that the position command offset amount computed by the means for calculating the position command offset amount does not become excessively large. The limiting value is set in advance.

The position command offset amount obtained by way of the synchronization correction processing unit 10 is added to the position command of the position control unit 2B of the servo circuit unit B. The position command offset amount is not limited to being added solely to the position command of the position control unit 2B of the servo circuit unit B, and may be added to the position command of the position control unit 2A of the servo circuit unit A.

Correcting the position command by way of the synchronization correction processing unit 10 reduces the physical interference between the servomotor 5A and servomotor 5B.

In the seventh example, the position command is corrected by using a table with a set relationship between the torque deviations and position command offsets. FIG. 10 is a diagram showing an example for correcting position commands by using the table with the set relationship between the force that acts between the motors and the offset amount. The structures of the servo circuit unit A and servo circuit unit B are the same as the examples shown in FIG. 5, so a description is omitted here.

The synchronization correction processing unit 10 has recording means for computing the relationship between the torque deviation and the position command offset amount in advance by way of the structure in FIG. 9 or other means, and recording the relationship to the recording means. When the difference (deviation) in torque commands is input, the corresponding position command offset amount is computed and output with reference to the table.

The position command offset amount obtained by way of the synchronization correction processing unit 10 is added to the position command of the position control unit 2B of the servo circuit unit B. The position command offset amount is not limited to being added solely to the position command of the position control unit 2B of the servo circuit unit B, and may be added to the position command of the position control unit 2A of the servo circuit unit A.

In the example shown in FIG. 10, the relationship between the torque deviations and the position command offset amounts is stored, but a structure may be adopted whereby the relationship between the actual electric current deviations and the position command offset amounts is stored, the difference in actual electric currents is input, and the position command offset amount is output. In the structural examples shown in FIGS. 7 to 10, the position command offset amount that is output from the synchronization processing unit 10 is added to the position command of the position control unit of one of the servo circuits, but this amount may also be added to the position command of the position control units of both servo circuits. FIG. 11 is an eighth example, and it shows a structural example for adding the position command offset amount to the position command of the position control unit of both servo circuits.

Other than having a structure for adding the position command offset amount to the position command of the position control units 2A and 2B of the servo circuit units A and B, the structure is the same as that shown in FIG. 7, so a description is omitted here.

FIG. 12 is a diagram comparing conventional synchronous control and synchronous control according to the present invention. Conventional synchronous control is carried out by bringing position commands and position feedback detected by a position detector into agreement. Because control is carried out for each motor, force in the pulling direction is generated in one motor 1 and force in the pushing direction is generated in the other motor 2 due to the position displacement caused by thermal expansion or position detector errors in the position of both motors. Stress is applied to the both motors due to the force that is generated in opposing directions.

By contrast, the synchronous control of the present invention is performed such that instead of controlling the position so that the position feedback values from the motors are brought into agreement with the position command, the force that acts between the motors is computed, and control is carried out so as to reduce the force that acts between the motors. With this type of control, stress that is applied to both motors can be reduced because control is carried out so as to reduce the force that acts on both motors, even when displacement occurs due to thermal expansion and position detector errors in the position of both motors.

Figure 13A:
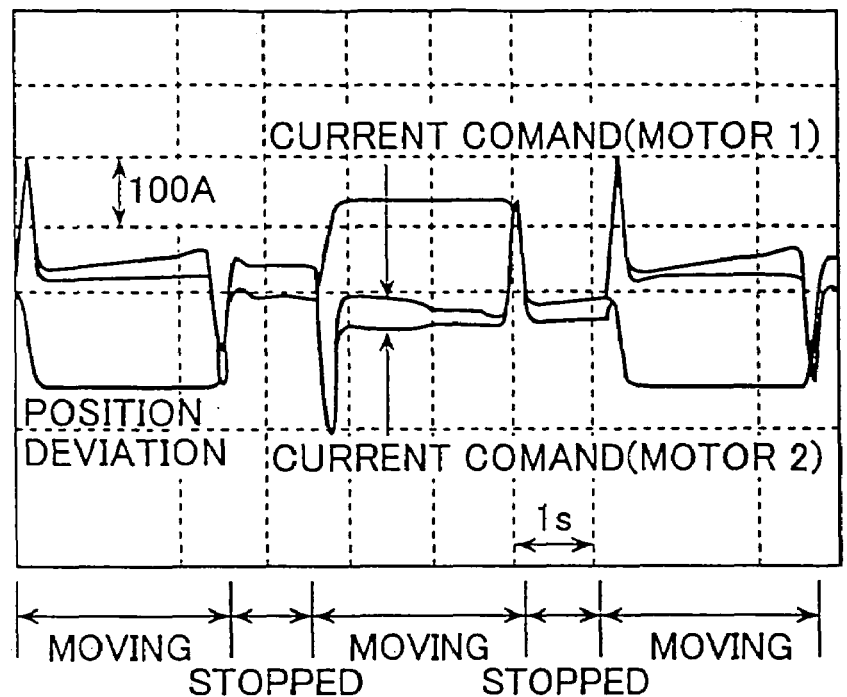
FIGS. 13A and 13B are diagrams showing the relationship between the electric current commands and the position deviation during motor feed.
Figure 13B:
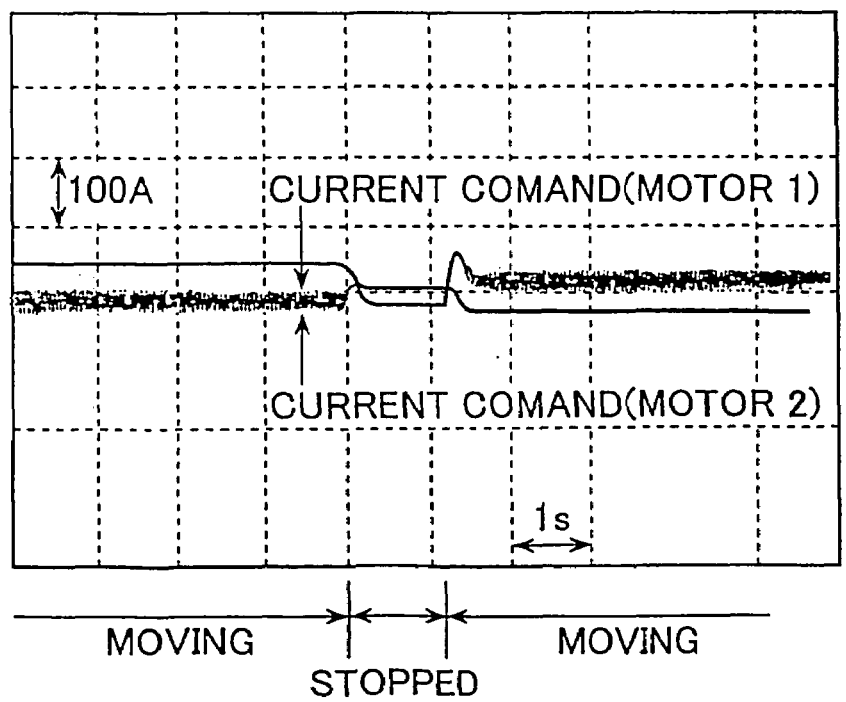

FIGS. 13A and 13B show the relationship between the electric current command and the position deviation during motor feed. FIG. 13A shows a situation in which the synchronous control of the present invention is not applied, and FIG. 13B shows a situation in which the synchronous control of the present invention is applied.

In FIG. 13A, the electric current commands to both motors become considerable due to the fact that the two motors are pulling against each other. In FIG. 13B, on the other hand, the phenomenon whereby the two motors pull against each other is resolved, and the electric current commands to both motors becomes smaller. The position deviation is also made smaller. FIGS. 13A and 13B show a situation in which the motor is moving and a situation in which the motor is stopped.

Figure 14A:
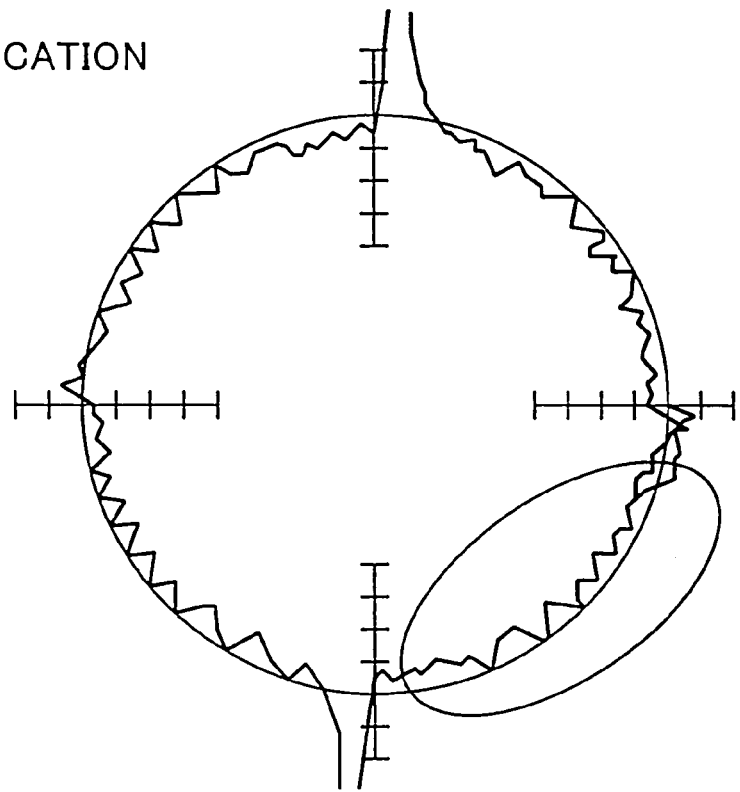
FIGS. 14A and 14B are diagrams showing the position deviation during circular correction.
Figure 14B:
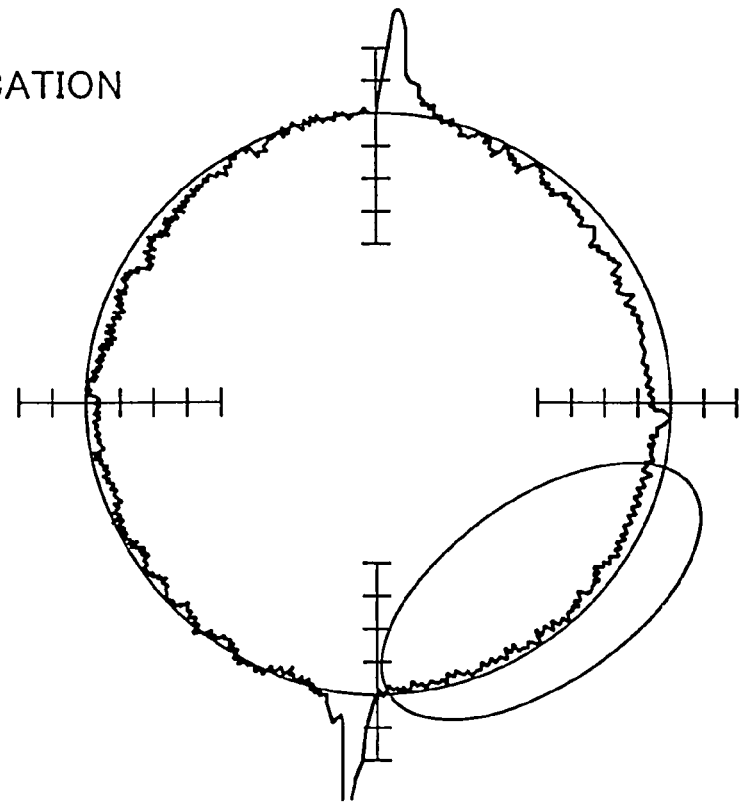

FIGS. 14A and 14B shows position deviations during circular correction. FIG. 14A shows a situation in which the synchronous control of the present invention is not applied, and FIG. 14B shows a situation in which the synchronous control of the present invention is applied.

In FIG. 14A, accuracy is reduced because the two motors move while creating interference. In FIG. 14B, on the other hand, accuracy is improved because the interference of the two motors is alleviated.

Next, an aspect in which the position deviation is corrected only when the force that acts between the motors is exceeded is described with reference to FIGS. 15 to 18, and an aspect in which the position command is corrected only when the force that acts between the motors is exceeded is described with reference to FIGS. 19 and 20.

Described below is an example for calculating the position deviation offset amount from the difference in torque commands and correcting the position deviation, but the same applies to an example in which the position deviation offset amount is calculated from the difference in actual electric currents, an example in which a table of torque values/position deviation offset amounts is used, an example in which corrections are applied to the two motors, and the like, so a description has been omitted.

Furthermore, an example for calculating the position command offset amount from the difference in torque commands and correcting the position command is described below, but the same applies to an example in which the position command offset amount is calculated from the difference in actual electric currents, an example in which a table of torque values/position command offset amounts is used, an example in which corrections are applied to the two motors, and the like, so a description thereof has been omitted.

Figure 15:
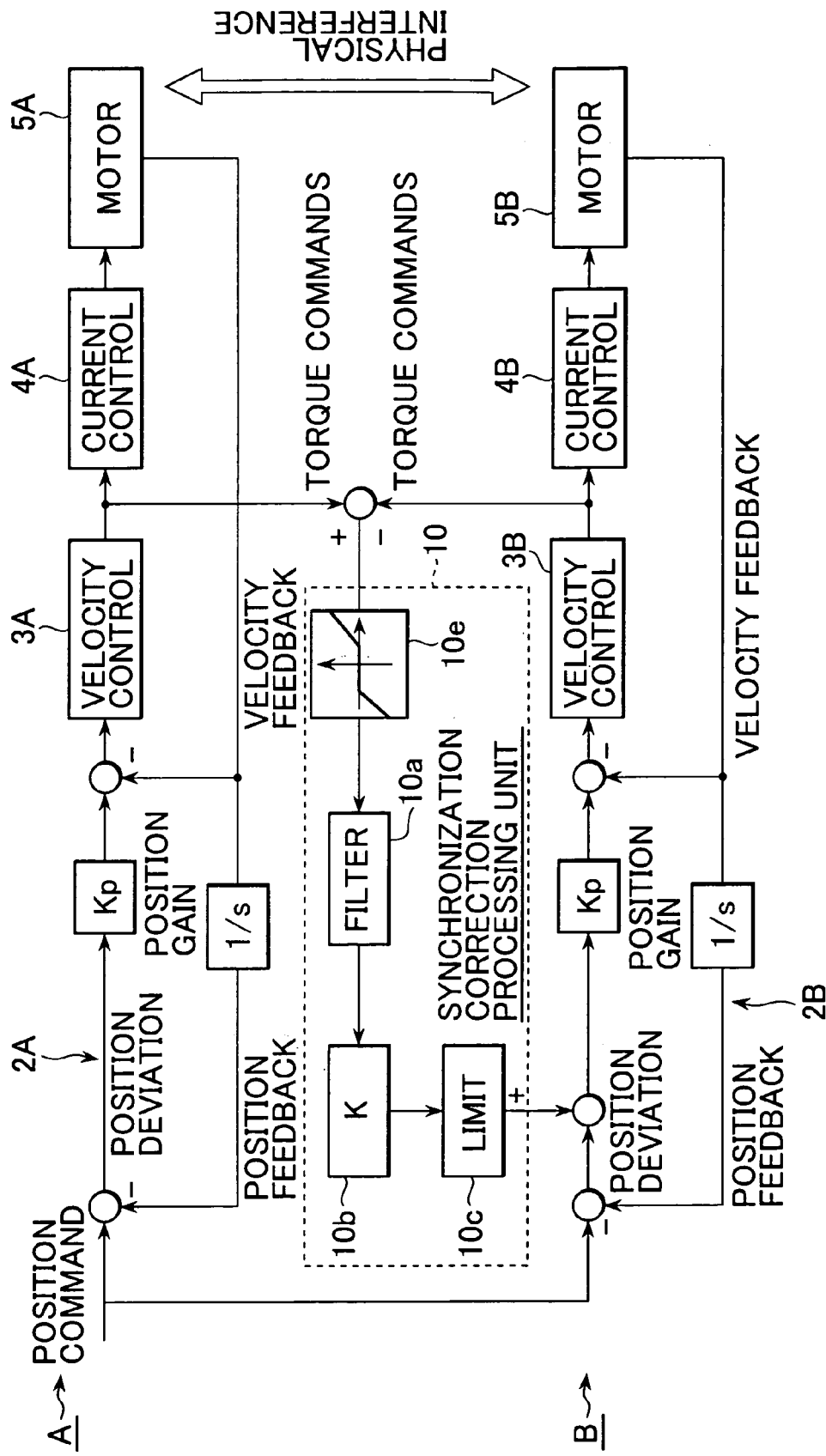
FIG. 15 is a diagram showing another structural example for correcting a position deviation with a position deviation offset obtained from the difference in torque commands.

First, an aspect in which the position deviation is corrected is described with reference to FIG. 15. FIG. 15 is an example for calculating the position deviation offset amount from the difference in torque commands, and the structure may be substantially the same as in FIG. 2. The synchronization correction processing unit 10 shown in FIG. 15 is equivalent to one in which a position deviation offset calculation processor 10e is added to the synchronization correction processing unit 10 shown in FIG. 2. The position deviation offset calculation processor 10e calculates the position deviation offset amount when the difference between the forces on the two servomotors exceeds a predetermined value. When the difference between the forces on the two servomotors is small and the predetermined value has not been exceeded, the position deviation offset amount is not calculated.

The position deviation offset calculation processor 10e outputs "0" when the difference between the forces on the two servomotors is equal to or less than the predetermined value (base), and when the difference exceeds the predetermined value, the difference or the value resulting from subtracting the predetermined value from the difference is output.

Figure 17:
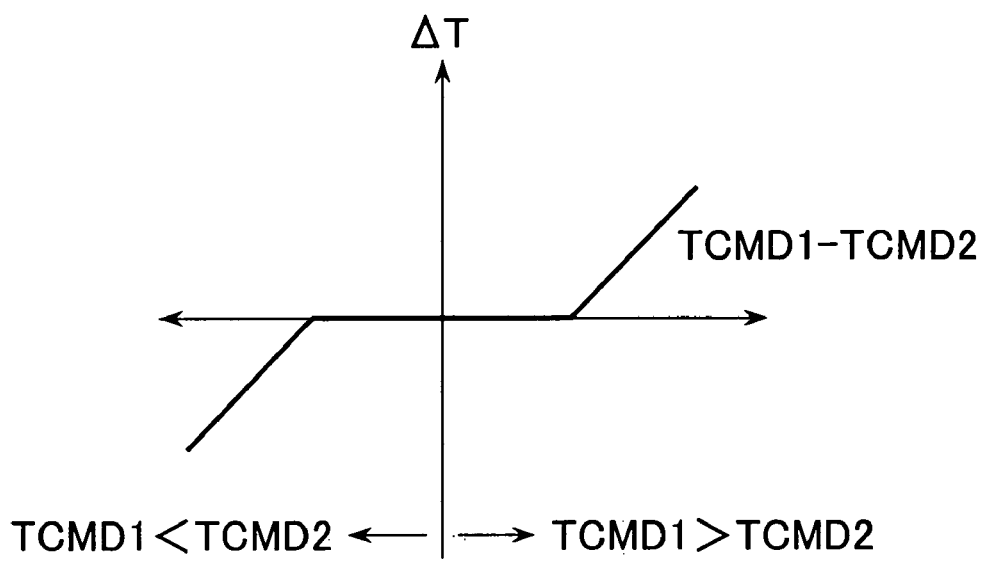
FIG. 17 is an output example of the position deviation offset calculation processor.
Figure 18:
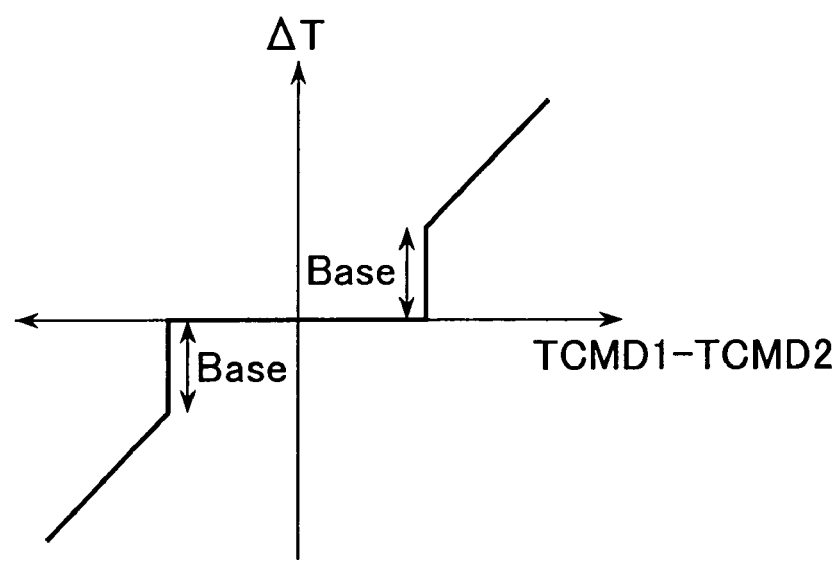
FIG. 18 is another output example of the position deviation offset calculation processor.
Figure 19:
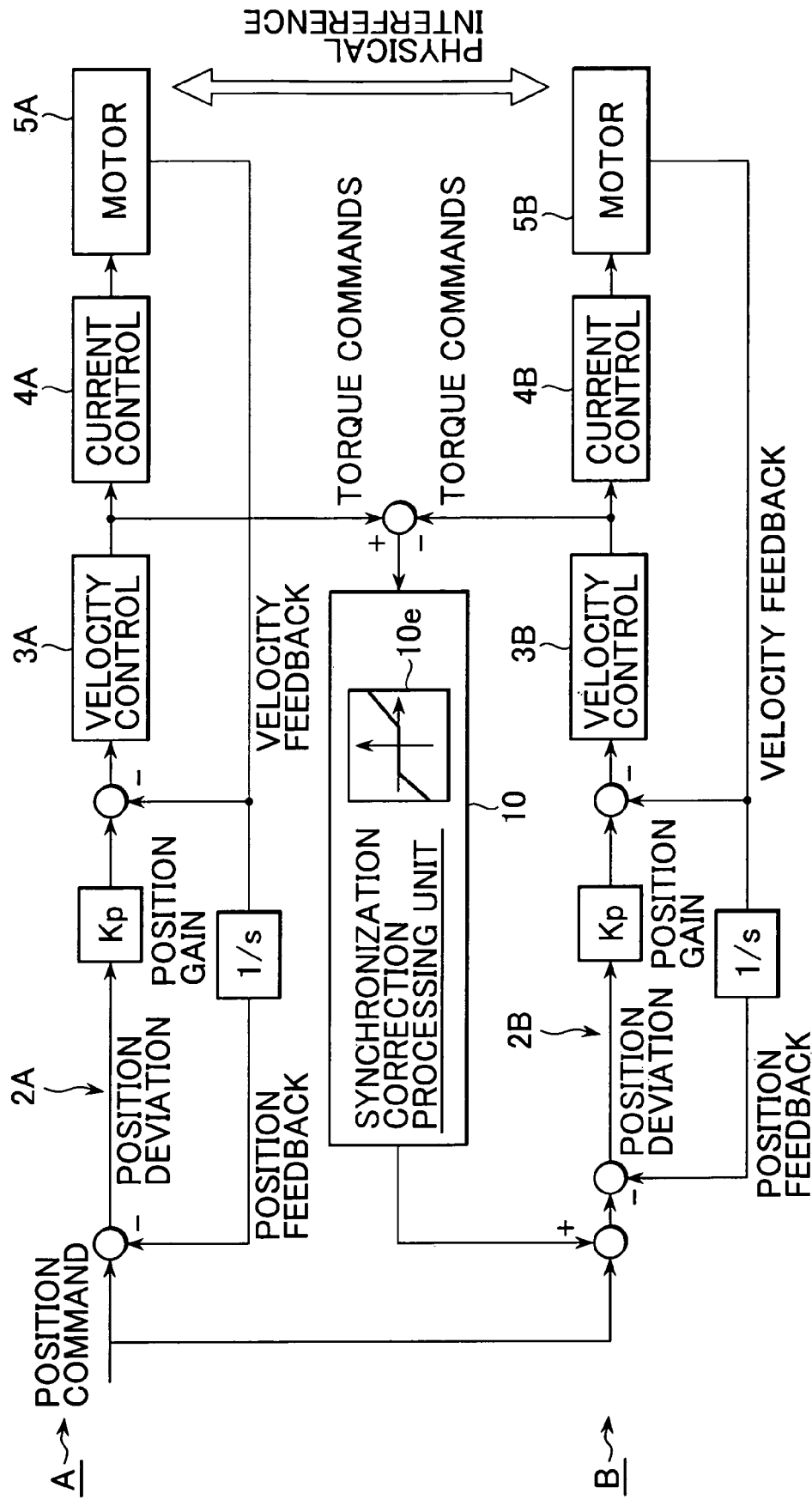
FIG. 19 is a diagram showing yet another structural example for correcting a position deviation with a position deviation offset obtained from the difference in torque commands.

FIGS. 17 and 18 are output examples of the position deviation offset calculation processor 10e, wherein the difference (TCMD1−TCMD2) between the forces on the two servomotors is plotted on the axis of abscissa, and the output ΔT is plotted on the axis of ordinate. The output example shown in FIG. 17 shows that "0" is output when the difference (TCMD1−TCMD2) is equal to or less than the predetermined value (base), and when the difference (TCMD1−TCMD2) exceeds a predetermined value, the value (TCMD1−TCMD2−base) resulting from subtracting the predetermined value from the difference is output. The output example shown in FIG. 18 shows that "0" is output when the difference is equal to or less than the predetermined value, and outputs the difference (TCMD1−TCMD2) when the difference exceeds the predetermined value.

The synchronization correction processing unit 10 concludes that there is no difference between the forces on the servomotors when the difference (TCMD1−TCMD2) between the forces on the two servomotors is equal to or less than the predetermined value, and the position deviation offset calculation processor 10e does not output the position deviation offset amount. On the other hand, when the difference (TCMD1−TCMD2) between the forces on the two servomotors exceeds a predetermined value, the position deviation offset calculation processor 10e outputs the difference between the forces on the two servomotors, and the synchronization correction processing unit 10 calculates the position deviation offset amount on the basis of this difference.

Figure 16:
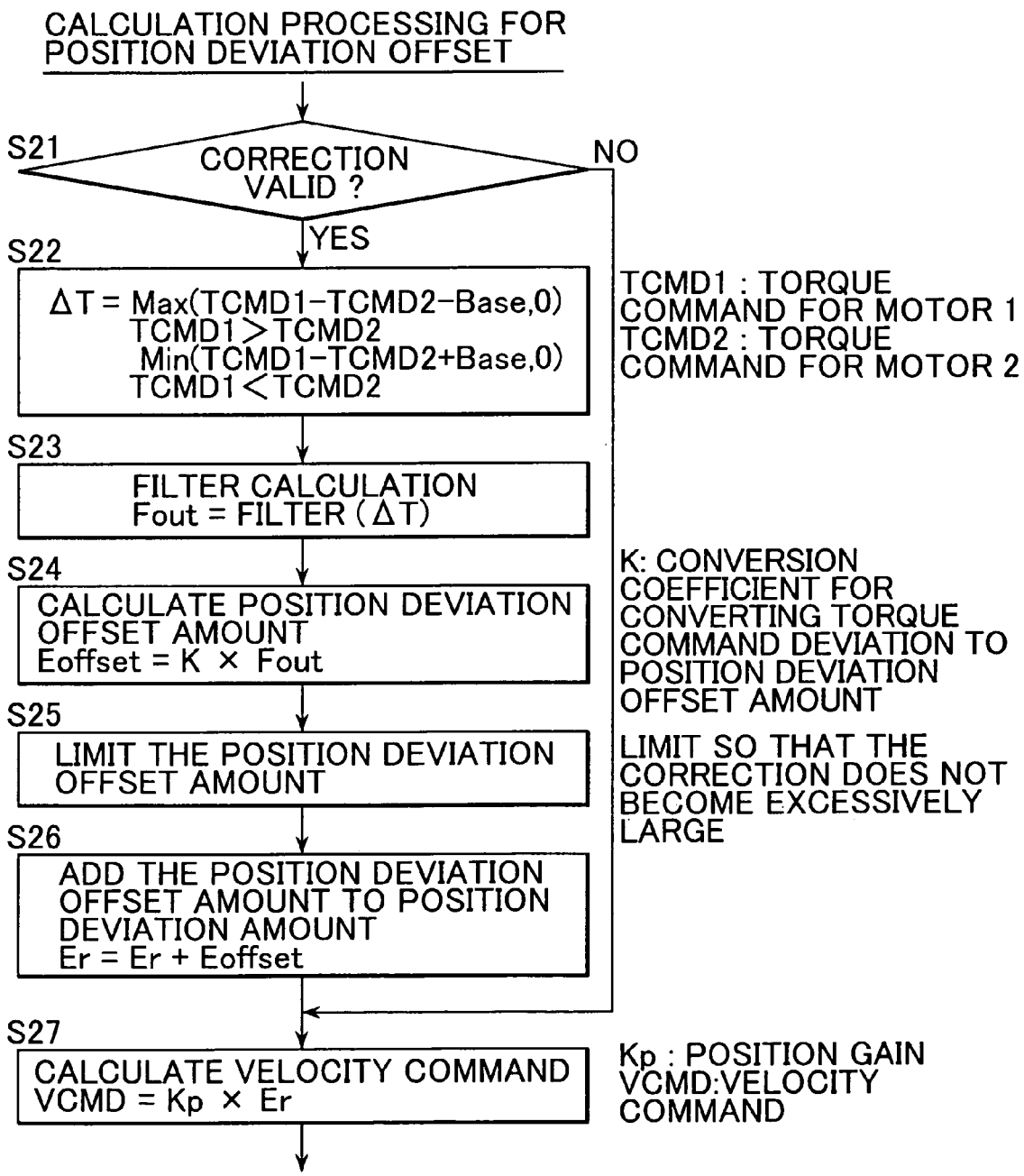
FIG. 16 is a flowchart of another embodiment for correcting position deviations of the present invention.

The flowchart shown in FIG. 16 depicts calculation processing for the position deviation carried out by the synchronization correction processing unit, and shows an example of computing a position deviation offset from the difference in torque commands shown in FIG. 15. The position deviation offset calculation processor 10e has the output characteristics shown in FIG. 17.

The flowchart shown in FIG. 16 is substantially the same as the flowchart shown in FIG. 3, and differs on the point of the calculation output provided in the difference calculation step (step S22), with the other steps being the same. In view of the above, only step S22 is described here. In difference calculation step (step S22), the deviation ΔT, which is the output of the position deviation offset calculation processor 10e, is allowed to output the greater of (TCMD1−TCMD2−base) and 0 when the torque command TCMD1 of the motor 1 is greater than the torque command TCMD2 of the motor 2, and to output the larger of (TCMD1−TCMD2+base) and 0 when the torque command TCMD1 of the motor 1 is less than the torque command TCMD2 of the motor 2, as shown in FIG. 17.

After the deviation ΔT is calculated in step S22, the velocity command is calculated in steps S23 to S27 with the same processing as in steps S3 to S7 in the flowchart in FIG. 3.

Next, an aspect in which the position command is corrected is described with reference to FIG. 19. FIG. 19 is an example for calculating the position command offset amount from the difference in the torque commands, and it may have substantially the same structure as the structure shown in FIG. 7. The synchronization correction processing unit 10 shown in FIG. 19 is equivalent to one in which the position deviation offset calculation processor 10e is added to the synchronization correction processing unit 10 shown in FIG. 7. The position deviation offset calculation processor 10e calculates the position deviation offset amount when the difference between the forces on the two servomotors exceeds a predetermined value. When the difference between the forces on the two servomotors is small and the predetermined value has not been exceeded, the position deviation offset amount is not calculated.

The position deviation offset calculation processor 10e, as described above, outputs "0" when the difference between the forces on the two servomotors is equal to or less than the predetermined value (base), and when the difference exceeds the predetermined value, this difference or the value resulting from subtracting the predetermined value from the difference is output.

The output characteristics of the position deviation offset calculation processor 10e can be the same as in the examples shown in FIGS. 17 and 18.

The synchronization correction processing unit 10 concludes that there is no difference between the forces on the servomotors when the difference (TCMD1−TCMD2) between the forces on the two servomotors is equal to or less than a predetermined value (base), and the position deviation offset calculation processor 10e does not output the position deviation offset amount. On the other hand, when the difference (TCMD1−TCMD2) between the forces on the two servomotors exceeds a predetermined value, the position deviation offset calculation processor 10e outputs the difference between the forces on the two servomotors, and the synchronization correction processing unit 10 calculates the position deviation offset amount.

Figure 20:
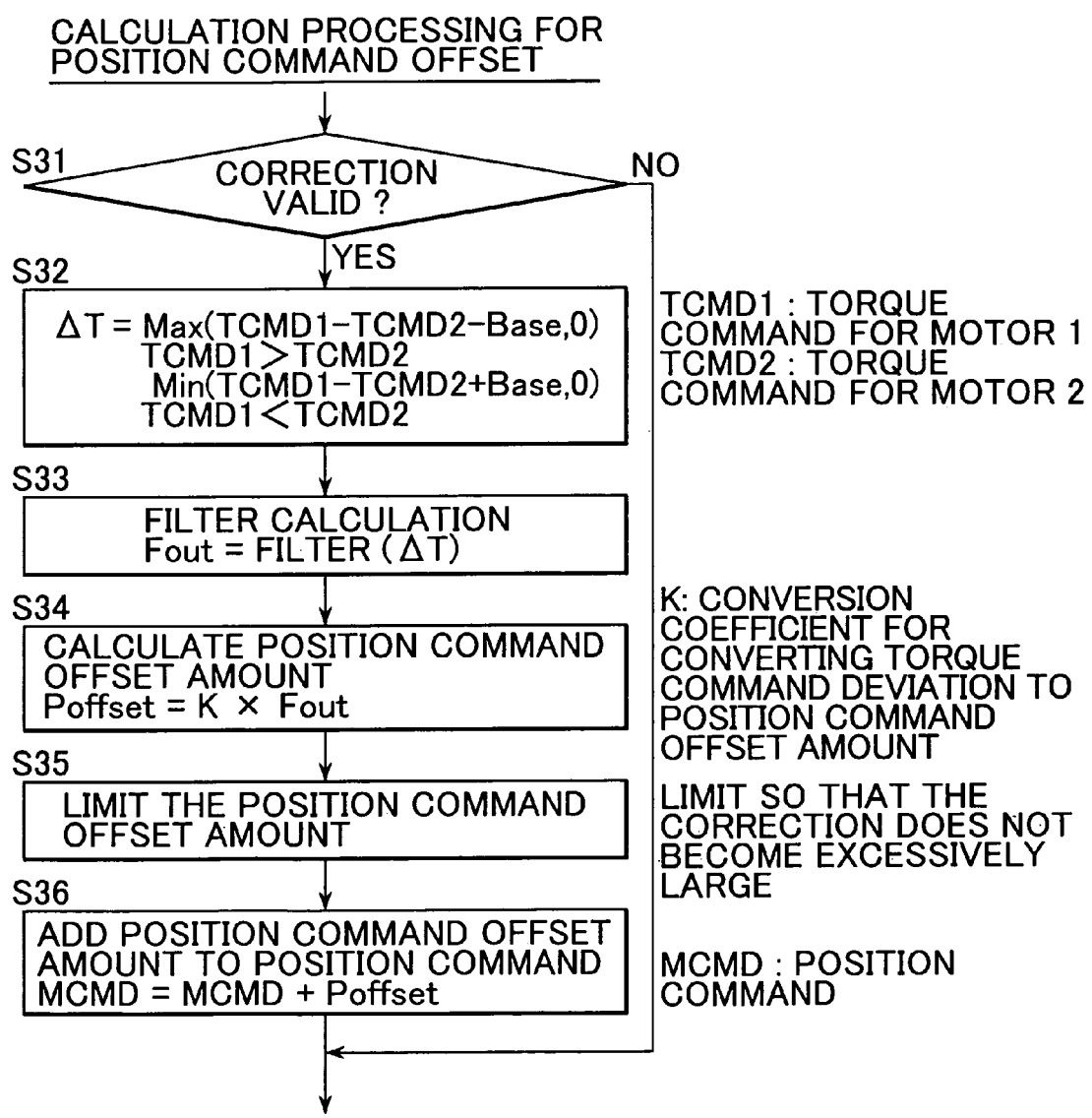
FIG. 20 is a flowchart of yet another embodiment for correcting position deviations of the present invention.

The flowchart shown in FIG. 20 depicts calculation processing for the position command carried out by the synchronization correction processing unit, and shows an example of computing the position command offset from the difference in torque commands shown in FIG. 15. The position deviation offset calculation processor 10e has the output characteristics shown in FIG. 17 or 18.

The flowchart shown in FIG. 20 is substantially the same as the flowchart shown in FIG. 3 and differs on the point of the calculation output provided in the difference calculation step (step S32), with the other steps being the same. In view of the above, only step S32 is described here. In step S32 for calculating the difference in torque commands, the deviation ΔT, which is the output of the position deviation offset calculation processor 10e, is allowed to output the greater of (TCMD1−TCMD2−base) and 0 when the torque command TCMD1 of the motor 1 is greater than the torque command TCMD2 of the motor 2, and to output the greater of (TCMD1−TCMD2+base) and 0 when the torque command TCMD1 of the motor 1 is less than the torque command TCMD2 of the motor 2, as shown in FIG. 17, or FIG. 18.

After the deviation ΔT is calculated in step S32, the position command offset amount is calculated and added to the position command in the steps S33 to S36 with the same processing as in steps S13 to S16 of the flowchart in FIG. 8.

As described above, a base is provided to the forces that act between the motors, and position deviations generated in the slave can be prevented by making corrections only when the difference in the forces is larger than the base.

What is claimed is:

1. A synchronous control device for controllably driving a servomotor, comprising:
    a position control unit for outputting velocity commands at each predetermined cycle on the basis of the position deviation between position feedback from a position detector and position command transmitted at each predetermined sampling cycle from a host control device or a host control unit, and
    a velocity control unit for outputting torque commands at each predetermined cycle on the basis of velocity feedback from velocity detectors and the velocity commands,
    wherein said synchronous control device synchronously controls two servomotors for driving the same control object and further comprises means for reducing the force that acts between the two servomotors on the basis of the force that acts between the two servomotors,
    and wherein the position control unit comprises:
        a position deviation offset calculation processor for calculating the offset amount of the position deviation on the basis of the force that acts between the two servomotors, and
        means for adding the position deviation offset amount calculated by the position deviation offset calculation processor to the position deviation,
    and wherein the position deviation offset calculation processor computes the force that acts between the two servomotors from the difference in the torque commands given to the two servomotors, and calculates the position deviation offset amount by multiplying the computed difference by a conversion coefficient.

2. The synchronous control device according to claim 1, wherein the position deviation offset calculation processor calculates the offset amount of the position deviation when the difference between the forces on the two servomotors exceeds a fixed value.

3. The synchronous control device according to either of claims 1 or 2, wherein the position deviation offset calculation processor comprises adjusting means for changing the position deviation offset amount at a frequency that is sufficiently lower than the frequency band of the position control unit.

4. A synchronous control device for controllably driving a servomotor, comprising:
    a position control unit for outputting velocity commands at each predetermined cycle on the basis of the position deviation between position feedback from a position detector and position command transmitted at each predetermined sampling cycle from a host control device or a host control unit, and
    a velocity control unit for outputting torque commands at each predetermined cycle on the basis of velocity feedback from velocity detectors and the velocity commands,
    wherein said synchronous control device synchronously controls two servomotors for driving the same control object and further comprises means for reducing the force that acts between the two servomotors on the basis of the force that acts between the two servomotors
    and wherein the position control unit comprises:
        a position deviation offset calculation processor for calculating the offset amount of the position deviation on the basis of the force that acts between the two servomotors, and
        means for adding the position deviation offset amount calculated by the position deviation offset calculation processor to the position deviation,
    and wherein the position deviation offset calculation processor computes the force that acts between the two servomotors from the actual electric currents that flow into the two servomotors, and calculates the position deviation offset amount by multiplying the computed difference by a conversion coefficient.

5. The synchronous control device according to claim 4, wherein the position deviation offset calculation processor calculates the offset amount of the position deviation when the difference between the forces on the two servomotors exceeds a fixed value.

6. The synchronous control device according to either of claims 4 or 5, wherein the position deviation offset calculation processor comprises adjusting means for changing the position deviation offset amount at a frequency that is sufficiently lower than the frequency band of the position control unit.

* * * * *